(12) United States Patent
Lee et al.

(10) Patent No.: US 11,341,204 B2
(45) Date of Patent: May 24, 2022

(54) IDENTIFYING AND PRESENTING MISALIGNMENTS BETWEEN DIGITAL MESSAGES AND EXTERNAL DIGITAL CONTENT

(71) Applicant: Adobe Inc., San Jose, CA (US)

(72) Inventors: Tak Yeon Lee, San Jose, CA (US); Jonggi Hong, College Park, MD (US); Eunyee Koh, San Jose, CA (US)

(73) Assignee: Adobe Inc., San Jose, CA (US)

( * ) Notice: Subject to any disclaimer, the term of this patent is extended or adjusted under 35 U.S.C. 154(b) by 319 days.

(21) Appl. No.: 16/419,676

(22) Filed: May 22, 2019

(65) Prior Publication Data

US 2020/0372399 A1    Nov. 26, 2020

(51) Int. Cl.
*G06F 16/955* (2019.01)
*G06N 20/00* (2019.01)
*G06F 9/451* (2018.01)
*G06F 16/93* (2019.01)

(52) U.S. Cl.
CPC .......... *G06F 16/9558* (2019.01); *G06F 9/451* (2018.02); *G06F 16/94* (2019.01); *G06F 16/9566* (2019.01); *G06N 20/00* (2019.01)

(58) Field of Classification Search
CPC .................................................. G06F 16/9558
See application file for complete search history.

(56) References Cited

U.S. PATENT DOCUMENTS

2006/0259567 A1  11/2006  Jennings
2009/0292608 A1  11/2009  Polachek
2014/0316772 A1  10/2014  Koll et al.
2016/0110433 A1   4/2016  Sawhney et al.
2019/0087915 A1   3/2019  DeLuca et al.
2019/0197077 A1*  6/2019  Li ....................... G06F 16/9558
2021/0081294 A1*  3/2021  Golubev .............. G06N 3/0454

OTHER PUBLICATIONS

"How does Litmus Checklist work?" taken from the Help Center section on https://litmus.com/help/products/how-does-checklist-work/ dated Mar. 4, 2016, p. 1-7.
U.S. Appl. No. 15/910,926, filed Sep. 4, 2020, Office Action.
U.S. Appl. No. 15/910,926, filed Feb. 5, 2020, Office Action.
U.S. Appl. No. 15/910,921, filed Feb. 15, 2022, Office Action.

* cited by examiner

*Primary Examiner* — Asher D Kells
(74) *Attorney, Agent, or Firm* — Keller Preece PLLC

(57) ABSTRACT

Methods, systems, and non-transitory computer readable storage media are disclosed for determining and resolving misalignments between digital messages containing links and corresponding external digital content. For example, in one or more embodiments, the disclosed systems extract a plurality of alignment classification features from a digital link in a digital message and corresponding external digital content. Based on the alignment classification features and using a machine learning classification model, the disclosed system can generate alignment probability scores for a plurality of misalignment classes. The disclosed system can report identified misalignments of corresponding misalignment classes in a misalignment identification user interface. Furthermore, the disclosed system can receive publisher input via the misalignment identification user interface to further personalize the machine learning classification model.

20 Claims, 19 Drawing Sheets

1222

1224 — We currently found 17 misaligned links. If you want to adjust the model's sensitivity, please drag the slider below.

1230 { 3    17                                          164

Less Sensitive                                  More Sensitive

1226 — Misaligned Links Found

| Empty page | Error page | Irrelevant page | Missing critical info | Too much unrelated info | Inconsistent info | Additional step |
|---|---|---|---|---|---|---|
| 0 | 0 | 8 | 0 | 0 | 0 | 0 |

1232

Drag the slider for each type of misalignment to adjust the model's sensitivity

1228 — The current link is misaligned because it contains inconsistent information.

Do you want to see more or fewer cases like this?

*Fig. 12B*

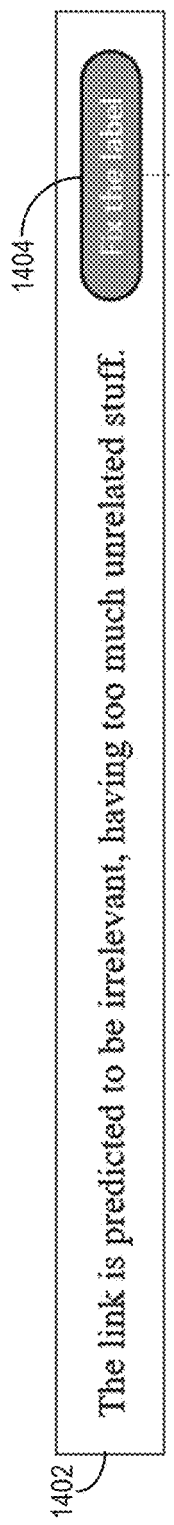
Fig. 14A
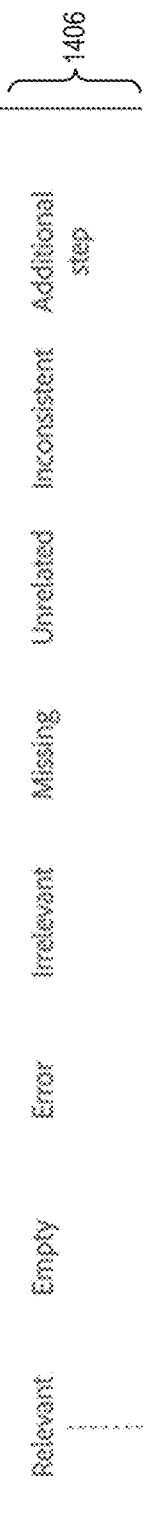
Fig. 14B
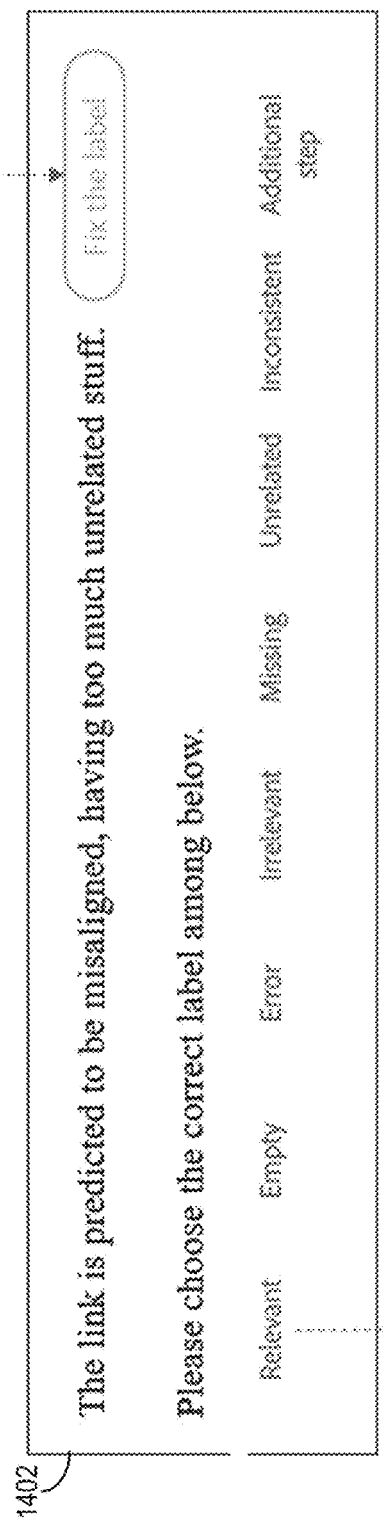
Fig. 14C
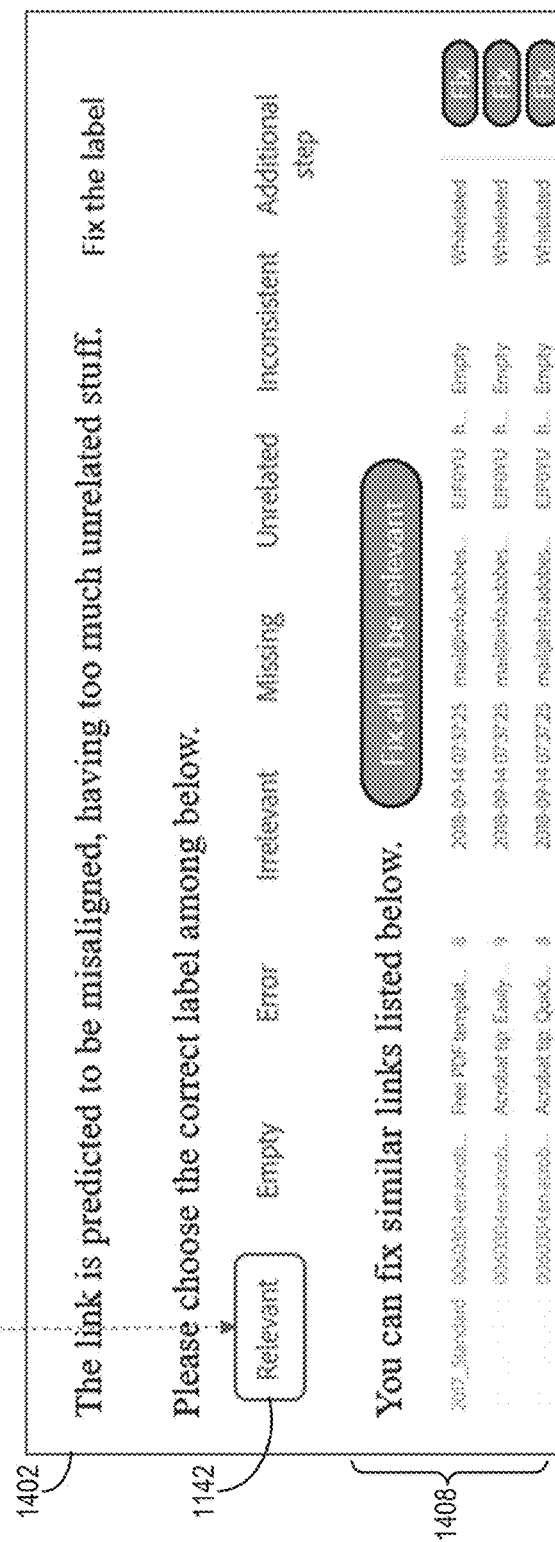

IDENTIFYING AND PRESENTING MISALIGNMENTS BETWEEN DIGITAL MESSAGES AND EXTERNAL DIGITAL CONTENT

BACKGROUND

Recent years have seen significant improvement in hardware and software platforms for generating, providing, and tracking digital content across computing devices of a plurality of users. For example, developers have created digital content distribution systems that generate and transmit digital content to numerous client devices, where the transmitted digital content includes links to additional external digital content that the client devices can access. For example, conventional digital content publishing systems can generate customized emails for thousands of unique users, add links within the customized emails, transmit the emails, and provide additional digital content based on interaction with the digital links.

Although conventional digital content publishing systems can generate and provide digital messages to client devices, they are often inaccurate and inefficient. Indeed, conventional digital content publishing systems often send digital messages with links to external digital content that become outdated or inaccurate. For instance, external digital content is dynamic and often undergoes a variety of changes independently of digital messages transmitted to client devices. External digital content (such as a website) may be moved, deleted, revised to add login requirements, or replaced over time, even though the links within a digital message have not changed. Accordingly, a client device that accesses a link from a digital message to external digital content often receives inaccurate data based on a variety of different types of inaccuracies (e.g., error messages, mismatching contents, login requirements, or redirection to a domain root).

Conventional digital content publishing systems lack efficient processes for addressing these inaccuracies. For example, conventional digital content publishing systems often require excessive time and user interaction to individually check each link within each unique email to identify various types of misalignments. For instance, when digital links within distributed digital content become inoperable, publishers operating conventional digital content publishing systems often do not know that the link is inoperable. To the contrary, publishers often remain unaware that distributed digital content contains inaccurate links unless they individually search out and analyze each individual link across digital content campaigns. Thus, in circumstances where a publisher distributes thousands of emails, conventional systems require publishers to check (e.g., access, click, and analyze) thousands upon thousands of links to identify and correct misalignments. Conventional systems then require publishers periodically re-check (e.g., re-access, re-click, and re-analyze) these links over time.

Moreover, even upon identifying that a misalignment exists, conventional digital content publishing systems require additional time and user interaction to identify and catalogue the type of error causing the misalignment. To illustrate, after identifying an error in a digital link, conventional systems require additional time and user interactions to identify and record whether the misalignment is a new login requirement, a modified webpage, a loading error, or some other type of misalignment. Thus, publishers must identify and catalogue misalignments and determine misalignment types before the misalignment can be addressed. This inefficient process requires extensive time, user interactions, and computer resources.

These and other disadvantages exist with respect to conventional digital content publishing systems.

SUMMARY

One or more embodiments provide benefits and/or solve one or more of the foregoing or other problems in the art with systems, methods, and non-transitory computer readable storage media for automatically identifying and presenting misalignments including corresponding misalignment classes between digital messages and external digital content within a digital content campaign. For example, the disclosed systems can identify, within a digital message (e.g., an email), a link to external digital content (e.g., a landing page). The disclosed system can extract a wide range of features from the digital message, the digital link, and the external digital content. The disclosed system can analyze the features utilizing a trained machine learning model to estimate alignment probability scores of a variety of misalignment classes between a digital message and external digital content. For example, the disclosed system can determine whether a linked landing page is empty, contains irrelevant information, requires a login, or fails to load successfully. The disclosed system can identify misalignments (including misalignment classes) by using these alignment probability scores and present the identified misalignments via a graphical user interface. The disclosed system can receive input from the publisher to address misalignments and to further train the machine learning model. Moreover, the disclosed systems provides a variety of user interface elements that allow for flexible personalization of models in identifying misalignments across different publisher devices.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which:

FIGS. 12A-12B illustrate an example misalignment identification user interface for a digital message in accordance with one or more embodiments;

FIGS. 14A-14C illustrate a series of example misalignment correction user interface elements in accordance with one or more embodiments;

DETAILED DESCRIPTION

Figure 1:
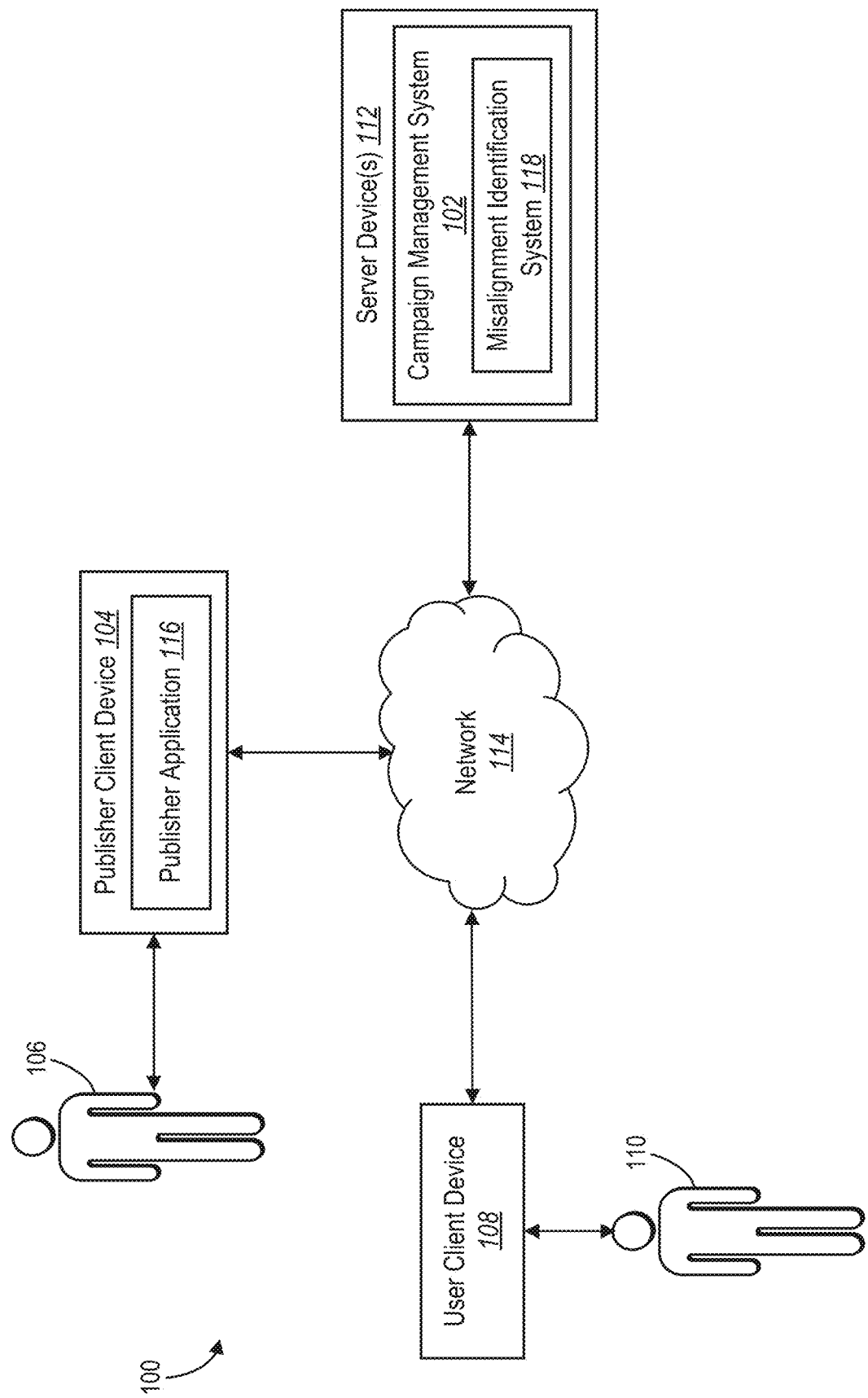
FIG. 1 illustrates an environment in which a misalignment identification system can operate in accordance with one or more embodiments.

One or more embodiments of the present disclosure include a misalignment identification system that automatically identifies and presents misalignments and misalignment classes between digital messages and external digital content within a digital content campaign. Specifically, the misalignment identification system can train and utilize a machine learning model to identify misalignments between external digital content and digital messages that include links to the external digital content. To illustrate, in one or more embodiments, the misalignment identification system extracts a wide range of features from digital messages (e.g., emails), links within the digital messages, and the linked external digital content (e.g., landing pages). Utilizing a machine learning model, the misalignment identification system can analyze the features to infer alignment probability scores of misalignment classes. Based on the alignment probability scores for the misalignment classes, the misalignment identification system can determine misalignments between the external digital content and digital messages. The misalignment identification system can present these misalignments to a publisher via a graphical user interface. Moreover, the misalignment identification system can receive publisher feedback through the graphical user interface to further personalize the machine learning model.

For example, in one or more embodiments, the misalignment identification system identifies, within a digital message, a digital link to external digital content. The misalignment identification system can identify a plurality of alignment classification features based on the digital link, the digital message, and the external digital content. Additionally, the misalignment identification system can utilize a machine learning classification model to generate alignment probability scores for a plurality of misalignment classes based on the alignment classification features. The misalignment identification system can identify one or more misalignments between the digital message and the external digital content based on the alignment probability scores. Moreover, the misalignment identification system can provide, for display at a publisher device, a misalignment identification user interface comprising the one or more misalignments.

As just mentioned, in one or more embodiments, the misalignment identification system extracts a plurality of alignment classification features from a digital message and external digital content. For example, the misalignment identification system can analyze images and text of a digital message and/or images and text of the external digital content associated with the link to extract semantic similarity features, common subsequence features, number features, URL features, visual chunk features, and/or color statistic features.

Upon extracting the alignment classification features, the misalignment identification system can utilize a machine learning classification model to identify misalignments. To illustrate, the misalignment identification system can analyze the alignment classification features utilizing a classification neural network to generate predicted misalignment classes. For example, the plurality of misalignment classes can include an empty classification (e.g., indicating that a landing page is empty), a loading error classification (e.g., indicating an error in loading a landing page), a semantic relevance classification (e.g., indicating that a landing page includes irrelevant information relative to a digital message), a popup classification (e.g., indicating that a landing page includes a popup), a login classification (indicating a landing page includes or requires a login), or a missing critical information classification (e.g., that a landing page is missing critical information from a digital message). The misalignment identification system can also generate alignment probability scores for the plurality of misalignment classes.

Based on the alignment probability scores, the misalignment identification system can identify one or more misalignments between the digital message and the external digital content. In particular, the misalignment identification system can identify threshold values for each of the plurality of misalignment classes. In at least one embodiment, the misalignment identification system identifies misalignments based on misalignment classes for which the associated alignment probability scores meet the respective threshold value.

In addition to utilizing a machine learning classification model, in one or more embodiments the misalignment identification system also trains the machine learning classification model. To illustrate, in some embodiments the misalignment identification system trains the machine learning classification model using a global training dataset reflecting training digital messages and training external content with ground truth misalignments. Moreover, in some embodiments, the misalignment identification system can utilize additional personalized training data reflecting ground truth misalignments selected by a particular user (e.g., publisher). For example, the misalignment identification system can receive input from a publisher device and utilize the input as a ground truth misalignment to further personalize the model.

As mentioned above, the misalignment identification system can provide a misalignment identification user interface comprising one or more identified misalignments and a variety of user interface elements. For example, the misalignment identification system can present identified misalignments and elements for correcting misalignments and/or tailoring model parameters. To illustrate, the misalignment identification system can provide user interface elements to adjust threshold values for misalignment classes and elements for identifying that a misalignment is incorrectly (or correctly) classified. The misalignment identification system can utilize this input as personalized data for training a machine learning classification model.

The misalignment identification system provides a number of advantages over conventional digital content publishing systems. For example, the misalignment identification system can improve accuracy relative to conventional systems. In particular, the misalignment identification system can identify and correct a variety of different misalignments between digital links and external digital content in digital messages. As discussed above, by extracting alignment classification features and analyzing the alignment classification features utilizing a machine learning classification model, the misalignment identification system can accurately identify a variety of misalignment classes between digital messages and external digital content. Moreover, the misalignment identification system can utilize publisher input to train the machine learning classification model based on a publisher's unique documents and needs.

Furthermore, the misalignment identification system can also improve efficiency. For example, the misalignment identification system can reduce the time, user interactions, and computing resources utilized by conventional systems to identify and correct misaligned links. This is particular true in circumstances involving multiple digital messages including multiple digital links across multiple different digital content campaigns. Additionally, the misalignment identification system can reduce processing power utilized to search for, identify, and provide relevant digital content. Indeed, by identifying and resolving misalignments, the misalignment identification system can avoid the processing cost of providing inaccurate digital content and the processing cost of recipient devices in searching for digital content that client devices actually seek. The misalignment identification system can also reduce the number of client devices that navigate away from websites as a result of being presented with irrelevant digital content.

The misalignment identification system can also improve efficiency and performance of computing systems by providing misalignments via one or more user interfaces. For example, the misalignment identification system can identify and provide a misalignment identification user interface that includes digital messages, digital links, misalignments, and external digital content to one or more publisher client devices. Moreover, the misalignment identification system can receive publisher feedback to collect personalized data for further training the machine learning classification model. The misalignment identification user interface reduces user interactions, computing power, and time associated with conventional systems.

As illustrated by the foregoing discussion, the present disclosure utilizes a variety of terms to describe features and advantages of the misalignment identification system. Additional detail is now provided regarding the meaning of such terms. For example, as used herein, the term "digital message" (or "message") refers to an electronic communication between at least two computing devices. In particular, a digital message includes an electronic communication between at least two computing devices that includes visual digital content. For example, a digital message can include an email, text message, instant message, or social media post. A digital message can include digital content (or digital media) such as digital text, digital images, or digital video associated with a digital content campaign. Moreover, the term digital message can include a static digital message or a dynamic digital message.

As used herein, the term "digital link" (or "link") refers to a reference to data. In particular, digital link can include a reference to data (e.g., a document, webpage, or other digital media) that a user can directly follow by clicking, tapping, or hovering. For example, a digital link can include a hyperlink in a digital message that references/points to a website. When a user clicks, taps, or hovers over the link, the user's computing device may open a new interface including the external digital content.

As used herein, the term "external digital content" refers to digital content referenced by a link. In particular, external digital content can include the target location of a link within a digital message (i.e., a target location remote from a user client device accessing the digital message). For example, "external digital content" can refer to an electronic document or webpage (i.e., a landing page) accessible via a link of a digital message. For instance, external digital content can include a landing page (e.g., web site) corresponding to a digital link within an email.

As used herein, the term "alignment classification features" refers to characteristics or traits of a digital messages and/or external digital content. In particular, alignment classification features can include characteristics of a digital message and/or external digital content that indicate a measure of association between the digital message and the external digital content. For instance, alignment classification features can include characteristics that indicate common semantic meaning between digital messages and external digital content. Similarly, as described in greater detail below, alignment classification features can include features that indicate a measure of association with regard to numbers, text, tags, URLs, objects and/or visual appearance between a digital message and external digital content. In addition, alignment classification message features (i.e., alignment classification features for a message) can include digital text or an indicator of objects or visual content portrayed in a digital message and/or external digital content.

As used herein, the term "alignment probability score" refers to a measure (e.g., probability) of association between a digital message and external digital content. In particular, alignment probability score includes a value that reflects the probability that two digital objects are aligned or misaligned. More specifically, the misalignment identification system can calculate an alignment probability score for various misalignment classes. For example, the alignment probability score can be a value between 0 and 1 where an alignment probability score of 1 for a particular misalignment class indicates that a misalignment of the particular misalignment class exists between the digital link of a digital message and the external digital content.

As used herein, the term "misalignment classes" refers to categories of disparities (e.g., misalignments). In particular, misalignment classes can include categories that reflect a specific type of misalignment between a digital message and external digital content. For example, misalignment classes can include an empty classification (e.g., a "page not found" error), a loading error classification (e.g., a broken landing page), a semantic relevance classification (e.g., landing page information does not match the digital message information), a popup classification, a login classification (e.g., a landing page that requires login for viewing), a missing critical information classification, or other misalignments as disclosed herein. The misalignment identification system can generate alignment probability scores for each misalignment class.

As used herein, the term "misalignment" refers to an identified disparity between two objects. In particular, misalignment includes a logical, technical, visual, or contextual disconnect between a link in a digital message and external content corresponding to the link. A misalignment can correspond to any one of the misalignment classes discussed herein. For example, a misalignment may include a broken landing page, a redirected page, and/or a page containing information irrelevant to the digital message.

As used herein, a "machine learning model" (or "machine learning classification model") refers to a computer representation that can be tuned (e.g., trained) based on inputs to approximate unknown functions. In particular, the term "machine-learning model" can include a model that utilizes algorithms to learn from, and make predictions (e.g., classification predictions) on, known data by analyzing the known data to learn to generate outputs that reflect patterns and attributes of the known data. For instance, a machine-learning model can include but is not limited to a random forest algorithm, neural network (e.g., a convolutional neural network, recurrent neural network or other deep learning network), a decision tree (e.g., a gradient boosted decision tree), association rule learning, inductive logic programming, support vector learning, Bayesian network, regression-based model (e.g., censored regression), and/or principal component analysis.

As mentioned, a machine learning model can include a neural network. As used herein, the term "neural network" refers to a machine learning model that includes a model of interconnected artificial neurons (organized in layers) that communicate and learn to approximate complex functions and generate outputs based on a plurality of inputs provided to the model. In addition, a neural network is an algorithm (or set of algorithms) that implements deep learning techniques that utilize a set of algorithms to model high-level abstractions in data.

As described above, the misalignment identification system can identify and present misalignments between a digital link and external digital content. FIG. 1 illustrates an embodiment of an environment 100 in which a misalignment identification system 118 operates. In particular, the environment 100 includes a publisher client device 104 associated with a publisher 106, a user client device 108 associated with a user 110, and server device(s) 112. The server device(s) 112, the publisher client device 104, and the user client devices 108 may be communicatively coupled with each other either directly or indirectly (e.g., through the network 114, discussed in greater detail below in relation to FIG. 17).

As shown in FIG. 1, the environment 100 includes a user client device 108 associated with a user 110 and a publisher client device 104 associated with a publisher 106. The user client device 108 and the publisher client device 104 can include a smartphone, tablet, desktop computer, laptop computer, or other device that is able to send and/or receive digital messages via the network 114 (e.g., any of the devices discussed below in reference to FIG. 17).

As illustrated in FIG. 1, the publisher client device 104 also includes the publisher application 116. The publisher 106 (via the publisher application 116 on the publisher client device 104) can review, plan, modify, and/or execute digital content campaigns. For example, the publisher client device 104 can utilize the publisher application 116 to generate digital messages, generate (or modify) external digital content, and/or select campaign parameters (e.g., a budget, targeted user characteristics, or distribution channels) for a digital content campaign.

Similarly, as illustrated in FIG. 1, the environment 100 also includes the server device(s) 112. The server device(s) 112 can generate, store, receive, and/or transmit any type of data, including digital messages and/or external digital content. For example, the server device(s) 112 may receive digital messages and/or external digital content from the publisher client device 104. The server device(s) 112 can also transmit digital messages and/or external digital content to the user client device 108. In one or more embodiments, the server device(s) 112 may include a data server. The server device(s) 112 can also include a communication server or a web-hosting server.

As shown in FIG. 1, the server device(s) 112 can include the campaign management system 102 (which includes the misalignment identification system 118). The campaign management system 102 can manage, create, modify, and/or execute a digital content campaign associated with a product, service, individual, or entity. For example, the campaign management system 102 can identify one or more user client devices (e.g., the user client device 108) and provide customized digital content to the user client devices based on one or more campaign parameters. Furthermore, the campaign management system 102 can identify, generate, or receive campaign parameters and/or digital content for executing a digital content campaign (e.g., from the publisher client device 104).

The campaign management system 102 can send digital messages for a digital content campaign. The campaign management system 102 can also store external digital content for a digital content campaign. For example, the campaign management system 102 can send a digital message with a link to a landing page hosted on the server device(s) 112.

As shown in FIG. 1, the campaign management system 102 also includes the misalignment identification system 118. The misalignment identification system 118 can identify, present, and resolve one or more misalignments between links in digital messages and corresponding external digital content. To illustrate, in one or more embodiments, the campaign management system 102 (via the server device(s) 112) transmits a plurality of digital messages to client devices (e.g., including the user client device 108) with digital links to external digital content (e.g., external digital content hosted at the server device(s) 112). The publisher client device 104 can register the digital messages with the misalignment identification system 118 (e.g., to track the digital messages and ensure that the digital links do not become misaligned). In response, the misalignment identification system 118 can extract alignment classification features from the external digital content and the digital messages to identify misalignments. The misalignment identification system 118 can use a trained machine learning model to generate alignment probability scores for a plurality of misalignment classes and identify misalignments.

Furthermore, the misalignment identification system 118 can present a misalignment identification user interface comprising the one or more misalignments. For example, the misalignment identification system 118 can provide for display, on the publisher client device 104, a notification indicating an identified misalignment. Additionally, the misalignment identification system 118 may prompt the publisher 106 to correct misalignments found within the digital content campaign (e.g., prompt the publisher to input a measure of accuracy corresponding to the surfaced misalignments). In one or more alternative embodiments, the misalignment identification system 118 automatically resolves the misalignments (e.g., by altering external digital content hosted at the server device(s) 112, sending updated digital messages with modified digital links, or by altering any subsequent digital messages with the digital link to include a corrected digital link).

The misalignment identification system 118 can personalize results displayed to the publisher 106 via the misalignment identification user interface. In particular, the misalignment identification system 118 can utilize the misalignment identification user interface to receive input to further train the machine learning model or adjust the misalignment results included in the misalignment identification user interface. For example, the misalignment identification system 118 can receive corrected misalignments and/or adjusted thresholds.

As illustrated by the previous example embodiments, the misalignment identification system 118 (and/or the campaign management system 102) may be implemented in whole, or in part, by the individual elements of the environment 100. Although FIG. 1 illustrates the misalignment identification system 118 (and the campaign management system 102) implemented with regard to the server device(s) 112, it will be appreciated that the misalignment identification system 118 (and/or the campaign management system 102) can be implemented in any of the components of the environment 100. For example, campaign management system 102 and the misalignment identification system 118 can be implemented in whole, or in part, by the publisher client device 104 (e.g., by sending digital messages via the publisher client device 104, hosting external digital content at the publisher client device 104, identifying misalignments at the publisher client device 104, etc.).

Furthermore, although the environment 100 of FIG. 1 is depicted as having various components, the environment 100 may have any number of additional or alternative components. For example, in one or more embodiments, a third-party server (not illustrated) hosts external digital content and/or transmits digital messages to the user client device 108.

Figure 2:
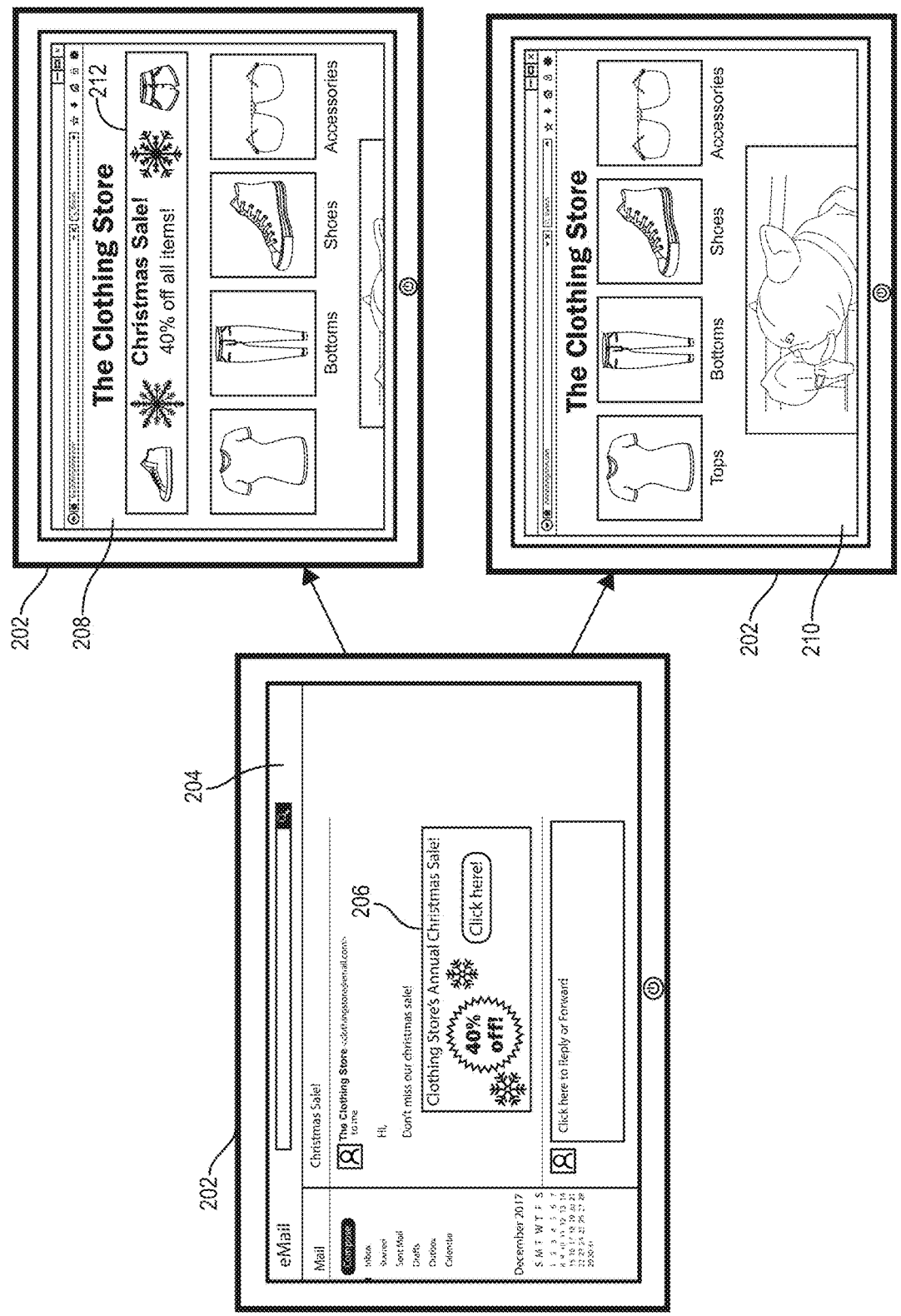
FIG. 2 illustrate an example email and example landing pages in accordance with one or more embodiments.

As discussed above, in one or more embodiments, the misalignment identification system 118 can identify, present, and resolve misalignments between digital links in digital messages and the linked external digital content. FIG. 2 illustrates an example email and example landing pages, including a misalignment between a digital link in an email and a corresponding landing page, in accordance with one or more embodiments. Specifically, FIG. 2 illustrates an example digital message 204 associated with a digital content campaign that comprises a digital link 206, an aligned landing page 208, and a landing page with a misalignment 210.

As shown in FIG. 2, a client device 202 presents a graphical user interface that includes a digital message 204 including the digital link 206. As illustrated, the digital message 204 includes text and images relating to a "Christmas Sale" at the Clothing Store. In particular, the digital link 206 includes both text (e.g., "Clothing store's Annual Christmas Sale!") and images (e.g., snowflakes) relevant to the Christmas sale.

The digital link 206 originally points to external digital content corresponding to the "Christmas Sale." For example, as shown in FIG. 2, after receiving an indication of a selection of the digital link 206, the client device 202 provides the aligned landing page 208 for display. First, the aligned landing page 208 comprises an active (e.g., not broken or dead) page. Additionally, the aligned landing page 208 includes a subject, images, and text that are relevant (i.e., semantically aligned) to the digital message 204.

As discussed above, digital links may often become outdated, incorrect, or connected to inaccurate content. In contrast to the aligned landing page 208, the landing page with a misalignment 210 includes one or more misalignments. For example, as illustrated in FIG. 2, the landing page with a misalignment 210 has been updated and is missing information regarding the Christmas Sale included in the digital link 206.

Although the landing page with a misalignment 210 is misaligned because it is missing relevant information, a misaligned digital link can manifest in a variety of different forms. For example, a moderator might modify a webpage, which causes redirection to a domain root, an error notification, or other irrelevant source. The misalignment identification system can identify various misalignment classes for misalignments. For example, misalignment classes can comprise an empty classification, a loading error classification, a semantic relevance classification, a popup classification, a login classification, and/or a missing critical information classification. More specifically, an empty classification can include landing pages that load but do not include any content such as a webpage that includes a "page not found" notification. The loading error classification can apply when external digital content that fails to load and often provides an "error loading" notification. The semantic relevance classification can apply when external digital content and a digital message include differences in semantics such as when a digital message advertising a Christmas sale but the linked digital content includes information about a spring sale. The popup classification can apply when the linked external digital content includes a popup element often requiring user interaction (e.g., closing the popup or entering user information) before displaying relevant content. The login classification can apply to external digital that requires a user input login information before displaying relevant content. The missing critical information classification can apply to external digital content that, based on information included in the digital message, is missing critical information. Regardless of the type of misalignment, however, the misalignment identification system 118 can identify the misalignment, notify a publisher, and resolve the issue.

Figure 3:
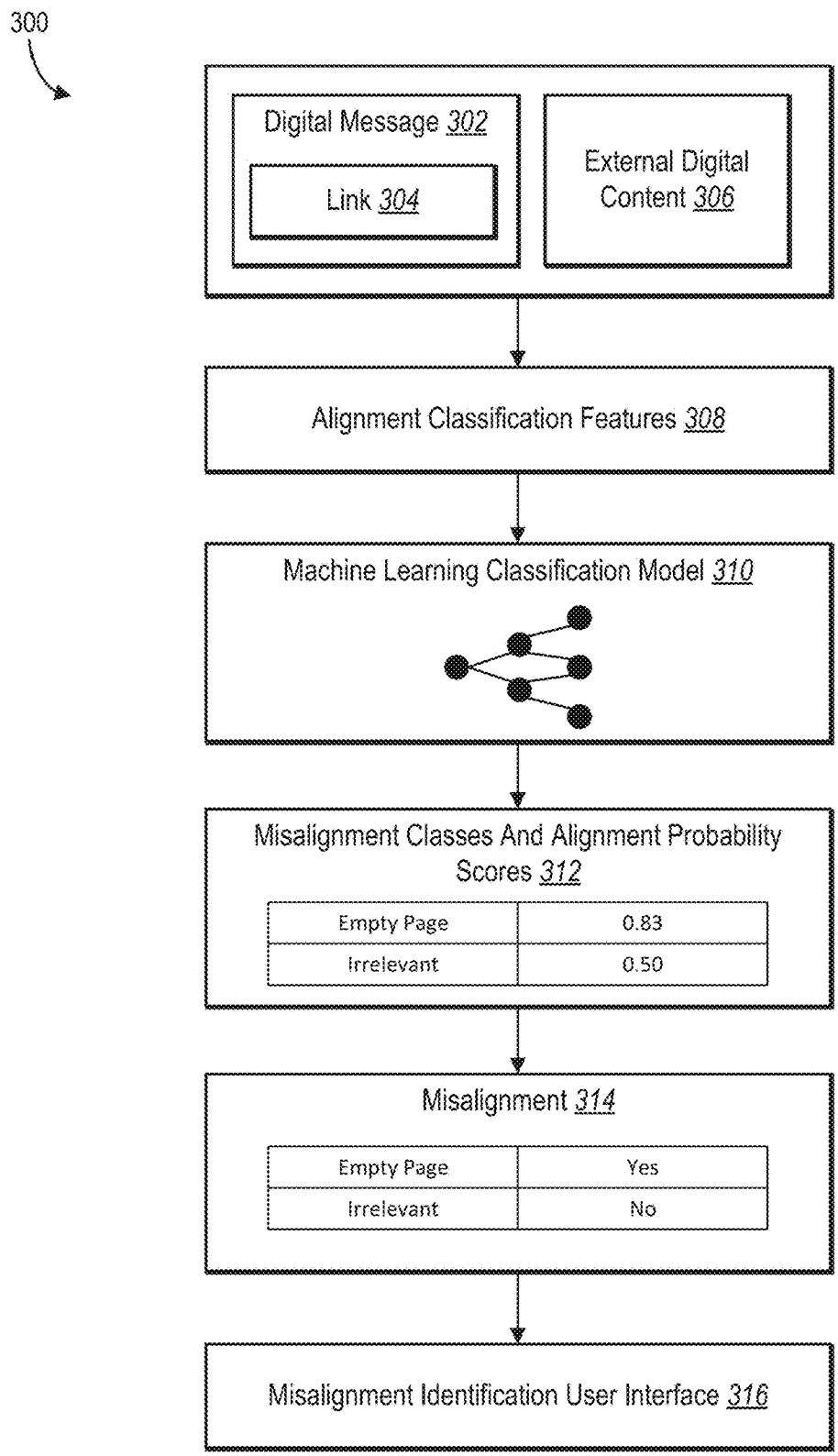
FIG. 3 illustrates an overview of identifying misalignments and presenting them in a misalignment identification user interface in accordance with one or more embodiments.

Indeed, as discussed above, the misalignment identification system 118 can identify digital misalignments by extracting alignment classification features and generating misalignment classes and alignment probability scores. FIG. 3 provides a general overview of identifying and presenting misalignments to a publisher device in accordance with one or more embodiments.

As illustrated in FIG. 3, the misalignment identification system 118 identifies a digital link 304 in a digital message 302. The digital link 304 can comprise a URL that leads to the external digital content 306. The misalignment identification system 118 analyzes the digital message 302, the digital link 304, and the external digital content 306. In at least one embodiment, the misalignment identification system 118 also identifies a critical area around the link.

Based on analyzing the digital message 302, the digital link 304, and the external digital content 306, the misalignment identification system 118 determines alignment classification features 308. For example, the misalignment identification system 118 compares characteristics of the digital message 302, the digital link 304, and the external digital content 306 to determine alignment classification features.

The misalignment identification system 118 can utilize a variety of different alignment classification features in identifying misalignments. For example, in at least one embodiment, the misalignment identification system 118 analyzes characteristics of a critical area around the digital link 304 to determine alignment classification features. For example, the misalignment identification system 118 can compare characteristics of the critical area around the digital link 304 to external digital content 306 to determine semantic similarity features between the digital link 304 and external digital content 306. Additional detail regarding analyzing a critical area is provided below (e.g., in relation to FIG. 4). Moreover, additional detail regarding determining semantic similarity features is provided below (e.g., with regard to FIG. 5).

In addition, to semantic similarity features, the misalignment identification system 118 can utilize a variety of additional alignment classification features. For example, the alignment classification features 308 can include a common subsequence feature (e.g., a longest common subsequence or a number of threshold length common subsequences between a digital message and external digital content), a number alignment feature (e.g., a measurement of common numbers between a digital message and external digital content), URL features (e.g., a measure of similarities in URLs in relation to a digital message and external digital content), a visual chunk feature (e.g., a measure of visual chunks in external digital content), and/or a color statistics feature (e.g., a measure of common color statistics between a digital message and external digital content). Additional detail regarding these features is provided below (e.g., in relation to FIGS. 6-10). By utilizing a plurality of alignment classification features 308, the misalignment identification system 118 can not only identify misalignments but also specifically identify misalignment classes and alignment probability scores corresponding to those misalignment classes.

As illustrated in FIG. 3, the misalignment identification system 118 analyzes the alignment classification features 308 via a machine learning classification model 310. The machine learning classification model 310 comprises a trained model that receives the alignment classification features 308 and generates misalignment classes and alignment probability scores 312. As will be discussed in additional detail below (e.g., in relation to FIG. 11B), the misalignment identification system 118 can train the machine learning classification model 310 using a public training dataset and a private training dataset.

The misalignment identification system 118 uses the machine learning classification model 310 to generate the misalignment classes and alignment probability scores 312. For instance, the misalignment identification system 118 estimates probabilities of misalignment classes between the external digital content 306 and the digital message 302. For example, as illustrated in FIG. 3, the misalignment identification system 118 generates an alignment probability score of 0.83 for the misalignment class "Empty page" (i.e., an empty classification). In addition, the misalignment identification system 118 generates an alignment probability score of 0.50 for the misalignment class "Irrelevant" (i.e., a semantic relevance classification). Although FIG. 3 illustrates two misalignment classes, the misalignment identification system 118 can determine alignment probability scores for a variety of different misalignment classes.

Based on the generated misalignment classes and alignment probability score 312, the misalignment identification system 118 identifies misalignments 314. The misalignment identification system 118 can identify threshold probability scores corresponding to the misalignment classes, and based on the alignment probability scores meeting the threshold probability score, determine the misalignments 314. The misalignment identification system 118 can also determine that external digital content 306 does not contain a semantic relevance classification when the semantic relevance alignment probability score falls below the threshold probability score. For example, the misalignment identification system 118 determines that because the alignment probability score for the semantic relevance classification (e.g., "Irrelevant"=0.50) falls below the threshold probability score (e.g., 0.60), the external digital content 306 does not have a misalignment of the semantic relevance classification.

As shown in FIG. 3, the misalignment identification system 118 presents a misalignment identification user interface 316. The misalignment identification user interface 316 presents identified misalignments 314. Additionally, the misalignment identification user interface 316 comprises threshold adjustment user interface elements and misalignment correction user interface elements. Based on publisher interaction with the threshold adjustment user interface element, the misalignment identification system 118 can change the sensitivity of reported misalignments. Based on interaction with the misalignment correction user interface elements, the misalignment identification system 118 can determine a measure of accuracy for a predicted misalignment.

Figure 4:
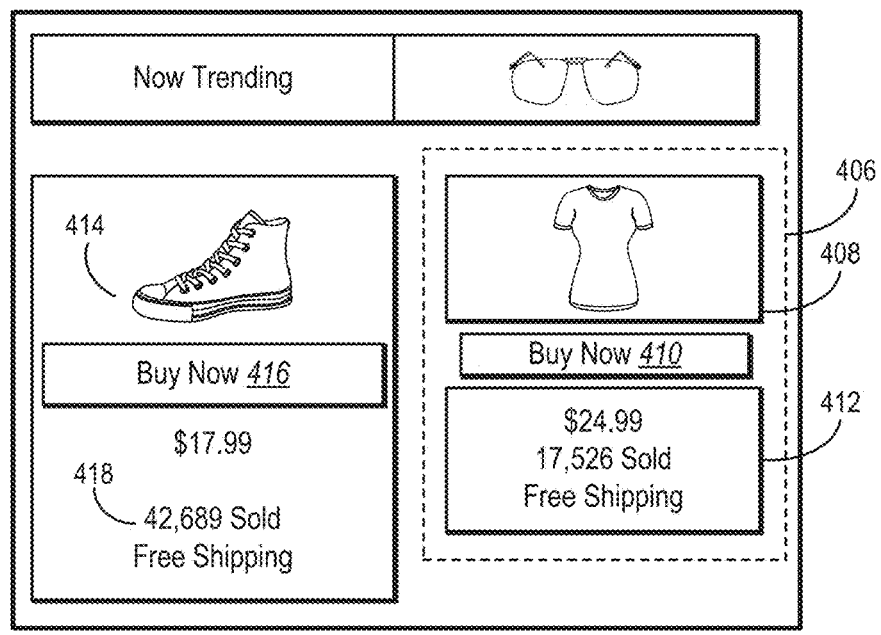
FIG. 4 illustrates an example digital message and its associated DOM in accordance with one or more embodiments.
Figure 4:
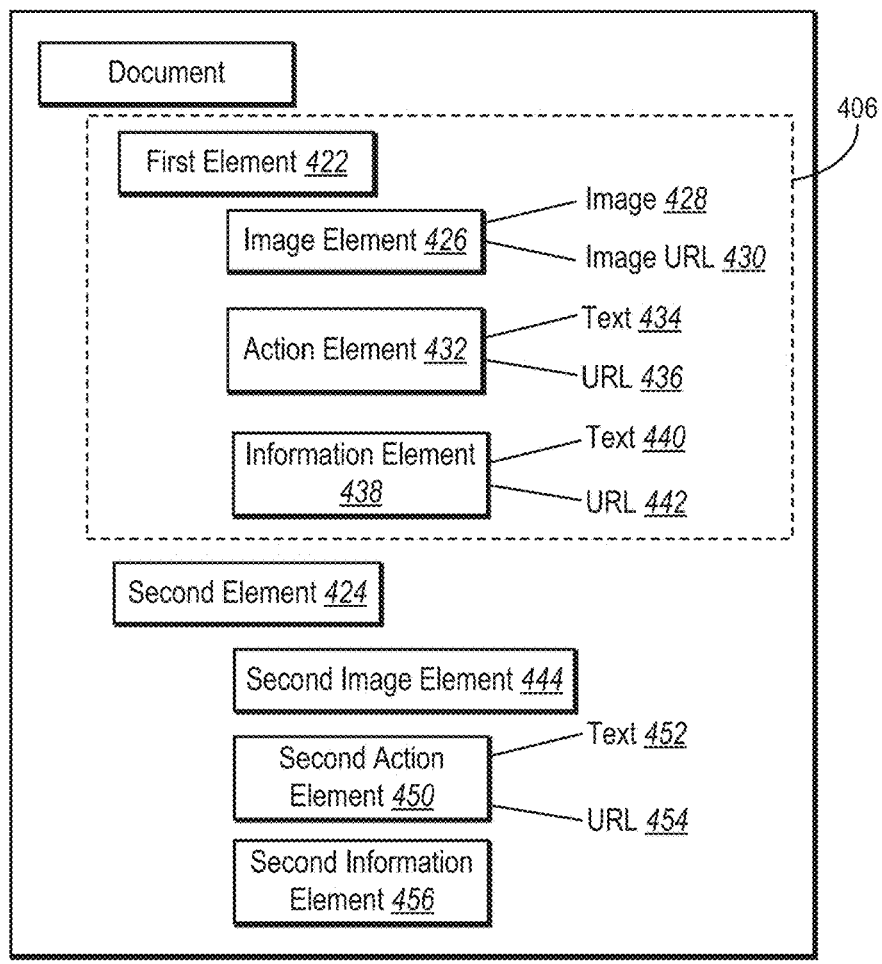

As discussed above, as part of analyzing the digital link 304, the digital message 302, and the external digital content 306, the misalignment identification system 118 can determine a critical area around a link. As used herein, the term "critical area" refers to an area that encompasses elements corresponding to a link. More particularly, "critical area" can include an area around a link that includes information pertinent to the link. To illustrate, a critical area can include elements of a digital message that include a common or shared URL. Accordingly, a critical area can include a region that encloses element whose links point to the same external digital content. FIG. 4 illustrates determining a critical area around the digital link 304 in a digital message 302 using a Document Object Model ("DOM") structure of the digital message 302. FIG. 4 includes the digital message 302 comprising a critical area 406. FIG. 4 also includes the Document Object Model 402 ("DOM 402") for the digital message 302 with the critical area 406.

As illustrated in FIG. 4, the digital message 302 includes a buy now element 410 and related digital content that provides information related to the buy now element 410. For example, the digital message 302 includes a digital image 406 and information 412. The digital message 302 also includes a second buy now element 416. The digital message 302 also comprises a second digital image 414 and second information 418 that include data relevant to the second buy now element 416. As illustrated, the critical area 406 includes the digital link 304, the digital image 406, and the information 412. Notably, the critical area 406 of the digital message excludes the second buy now element 416, the second digital image 414 and the second information 418. The critical area 406 includes the link and a larger area around the link while excluding information pertinent to other links.

In at least one embodiment, the misalignment identification system 118 accesses the DOM 402 of the digital message 302 to identify the critical area 406. The DOM 402 is an application programming interface that treats HTML, XHTML, or XML documents as a tree structure wherein each node is an object representing a part of the document. As illustrated in FIG. 4, the DOM 402 includes a first element 422 and a second element 424. The first element 422 itself comprises various subelements (e.g., child elements)

including an image element 426 representing the digital image 408, an action element 432 representing the buy now element 410, and an information element 438 representing the information 412. The second element 424 includes subelements (e.g., child elements) including a second image element 444 representing the second digital image 414, a second action element 450 representing the second by now element 416, and a second information element 456 representing the second information 418.

As illustrated in FIG. 4, each of the subelements includes additional content. For example, the image element 426 includes an image 428 and an image URL 430. The image 428 represents the image file displayed by the digital image 408, and the image URL 430 represents a link URL associated with the digital image 408. For example, if a user clicks on the digital image 408, the user will be directed to external digital content associated with the image URL 430. Similarly, the action element 432 includes text 434 and a URL 436. The text 434 comprises the text "buy now" of the buy now element 410, and the URL 436 includes the URL information for the buy now element 410. Additionally, the information element 438 includes a text 440 and a URL 442. The text 440 includes text "$24.99, 17526 Sold, Free Shipping" as included in the information 412. The URL 442 includes the URL information for the information 412. Furthermore, the subelements within the second element 424 also include additional content. For example, the second action element 450 includes text 452 and a URL 454. Though not illustrated, the subelements of the second image element 444 and the second information element 456 also include image content, text content, and URLs.

The misalignment identification system 118 identifies the critical area 406 in the DOM 402. For instance, the misalignment identification system 118 designates the buy now element 410 initially as the critical area 406 and expands the critical area 406 based on the DOM. The misalignment identification system 118 stops the expansion of the critical area 406 before the critical area 406 includes information relevant to other link URLs.

In particular, as illustrated, the DOM 402 has a hierarchy of parent-child nodes and sibling nodes (e.g., sibling nodes under each parent node). The misalignment identification system 118 can identify a critical area by expanding along this hierarchy. For example, as mentioned the misalignment identification system 118 can start at the action element 432 associated with the buy now element 410, then analyze sibling nodes to the action element 432. If the sibling nodes (e.g., the image element 426 and the information element 438) include the same URL (or do not include a different URL), the misalignment identification system 118 can add the sibling nodes to the critical area 406. For example, as illustrated in FIG. 4, the misalignment identification system 118 determines that the image URL 430 of the sibling image element 426 and the URL 442 of the information element 438 comprise the same URL as the URL 436 of the action element 432. The misalignment identification system 118 can then expand to the parent node (e.g., the first element 412). If the parent node includes the same URL (or does not include a different URL), the misalignment identification system 118 can include the parent node in the critical area 406.

The misalignment identification system 118 can continue expanding the critical area 406 (e.g., to siblings of the parent node) until identifying an element with a different URL. For example, if the misalignment identification system 118 determines that a sibling node in the DOM 402 include a different URL, then the misalignment system 118 stops expansion of the critical area 406 before the critical area 406 includes the sibling node. Though not illustrated in FIG. 4, if the misalignment identification system 118 determines that the URL 436 is different than the image URL 430, the misalignment identification system 118 can expand the critical area 406 to include the action element 432 (but exclude the image element 426).

As illustrated in FIG. 4, the misalignment system 118 expands the critical area 406 to include the action element 432, the image element 426, the information element 438, and the parent first element 422. The misalignment system 118 determines that the URL 454 of the second action element 450 is different than the URL 436 of the action element 432. Thus, the misalignment system 118 stops expansion of the critical area 406 before including the second element 424 and the second element's 424 child nodes (e.g., the second image element 444, the second action element 450, and the second information element 456).

The misalignment identification system 118 can extract particular alignment classification features from the critical area 406 around the digital link 304. For example, the misalignment identification system 118 can extract a semantic similarity feature, a common subsequence feature, and a number alignment feature from the critical area 406. Each of these alignment classification features will be discussed in additional detail below.

Although FIG. 4 illustrates generating a critical area using the DOM in one embodiment, the misalignment identification system 118 can utilize additional methods to generate the critical area. For example, the misalignment identification system 118 can identify a link URL and expand the critical area to include links having URLs with the same domain root while excluding URLs with different domain roots. Additionally, the misalignment identification system 118 can extract tags, objects, words, or other features from digital message elements. The misalignment identification system 118 can expand the critical area for a digital link to include digital message elements with related tags. More specifically, the misalignment identification system 118 can identify semantic meanings of individual digital message elements and expand the critical area based on elements that share the same or similar semantic meanings.

Figure 5:
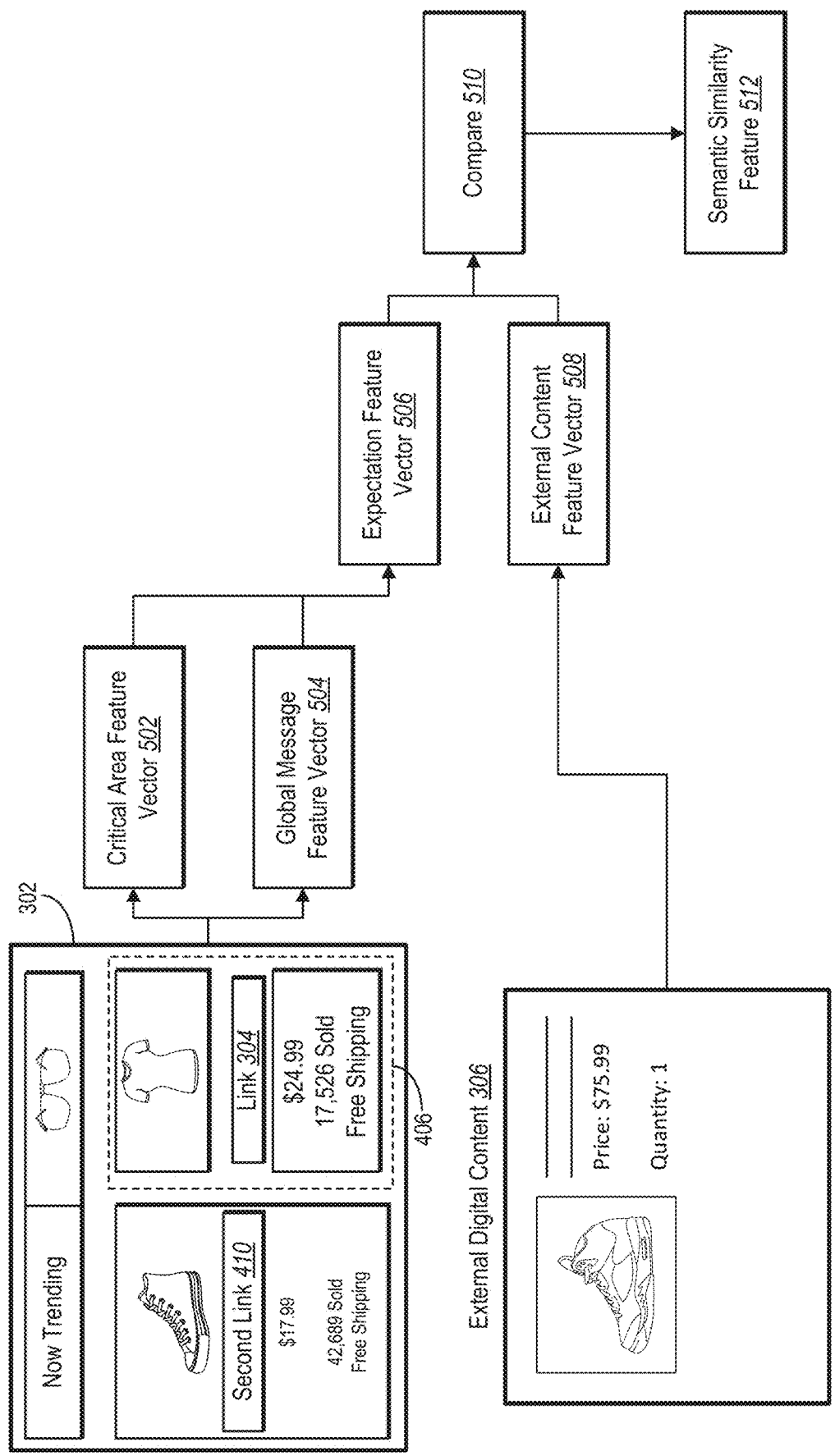
FIG. 5 illustrates generating a semantic similarity feature in accordance with one or more embodiments.
Figure 6:
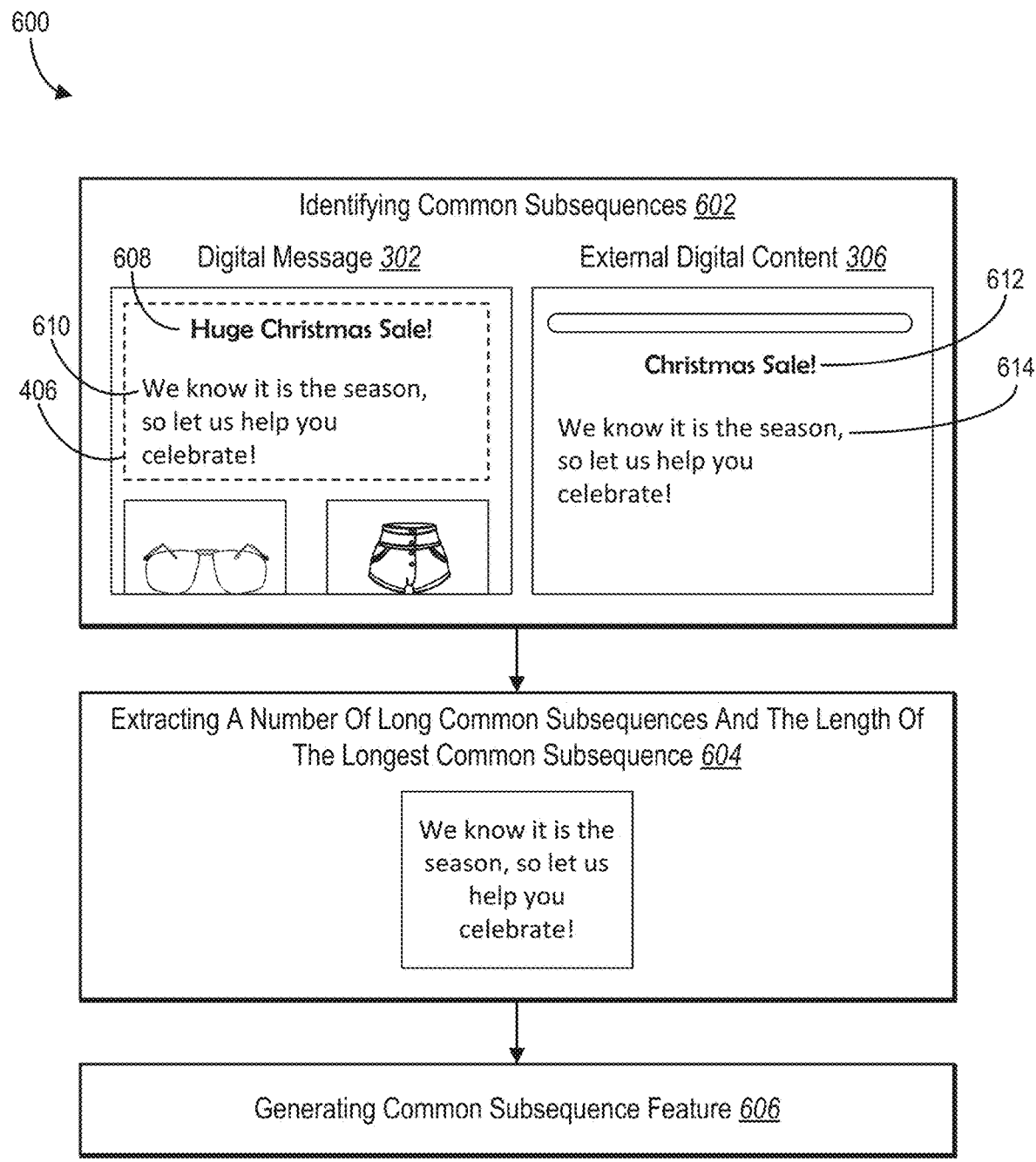
FIG. 6 illustrates generating a common subsequence feature in accordance with one or more embodiments.
Figure 7:
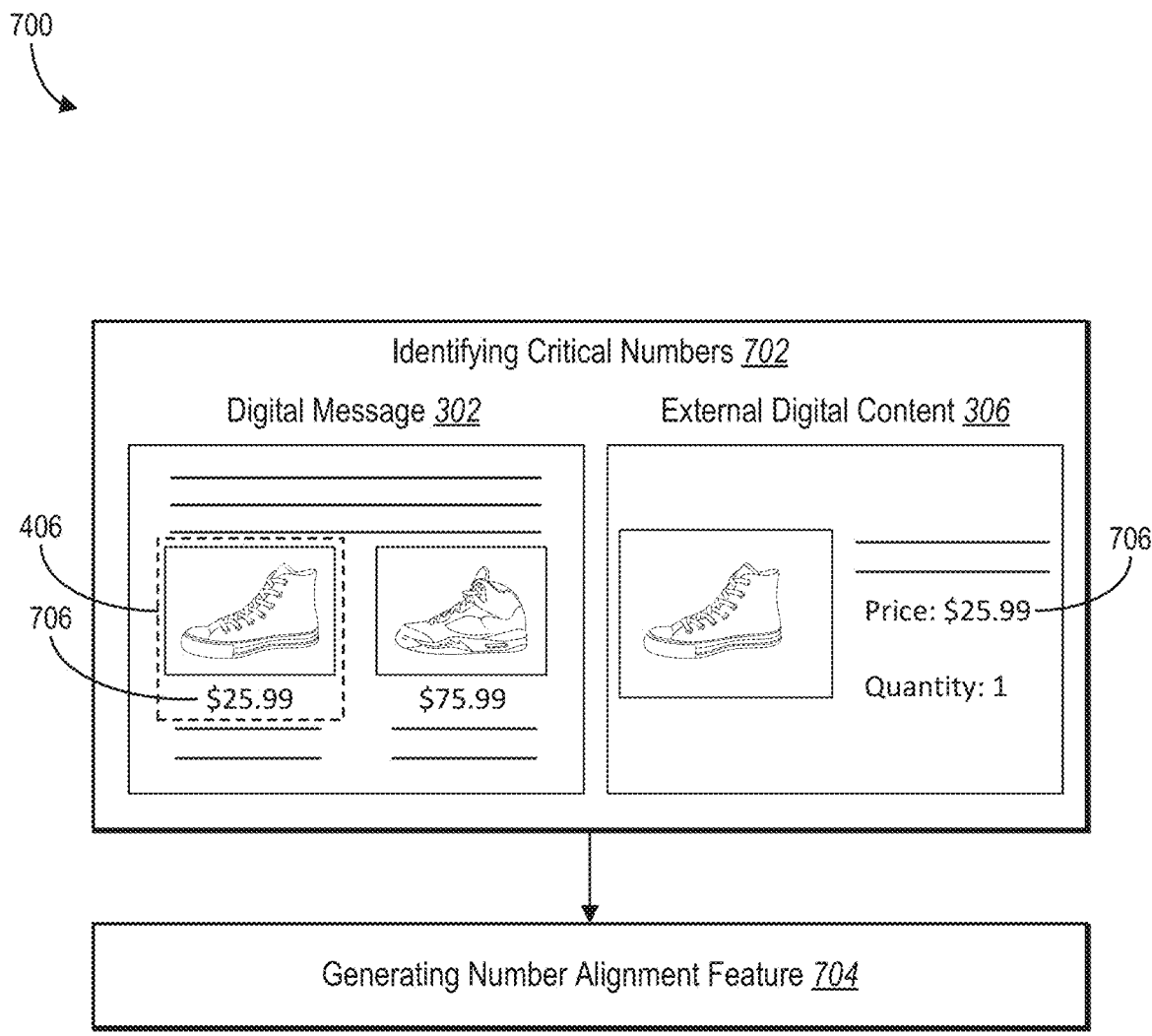
FIG. 7 illustrates generating a number alignment feature in accordance with one or more embodiments.
Figure 8:
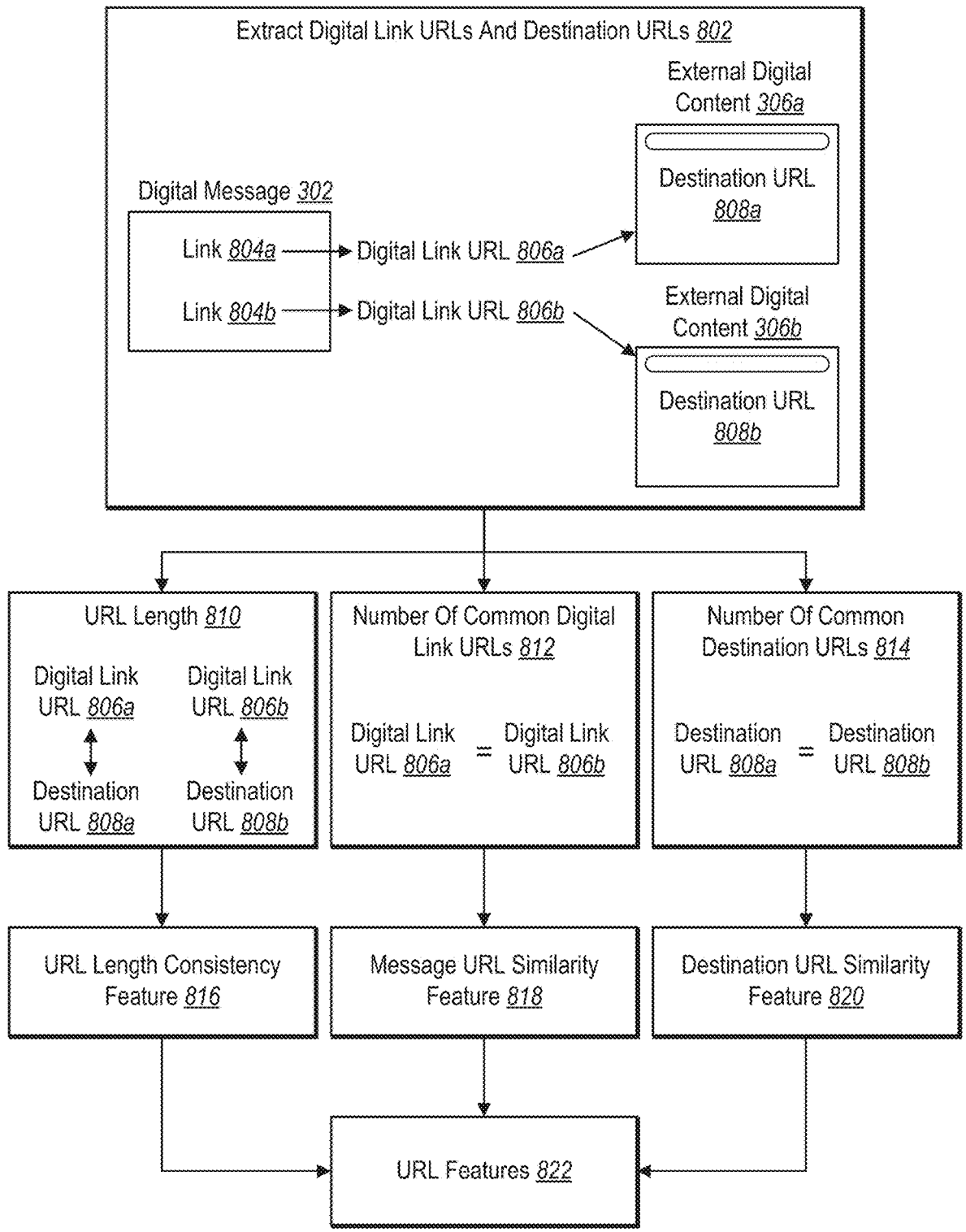
FIG. 8 illustrates generating URL features in accordance with one or more embodiments.
Figure 9:
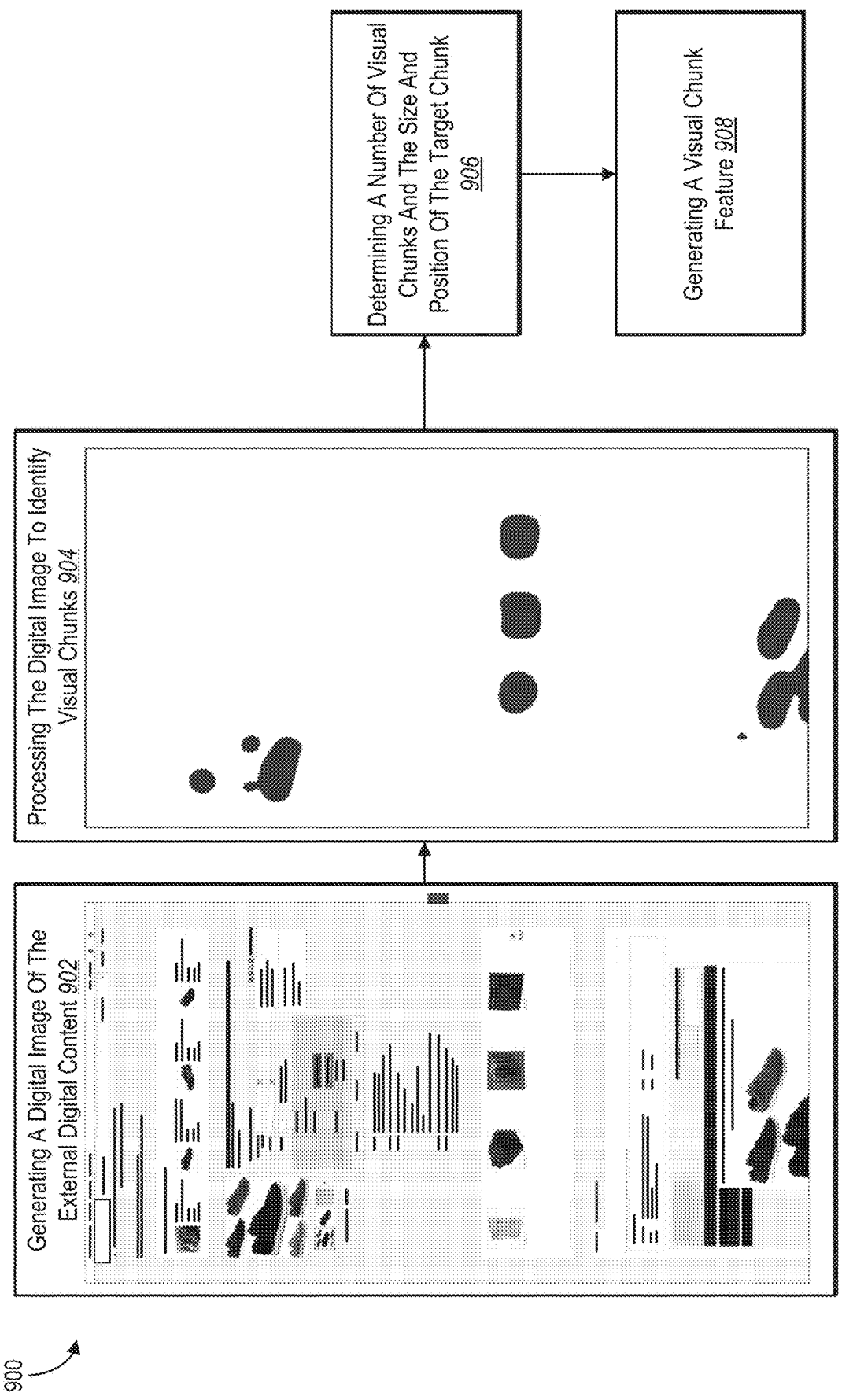
FIG. 9 illustrates generating a visual chunk feature in accordance with one or more embodiments.
Figure 10:
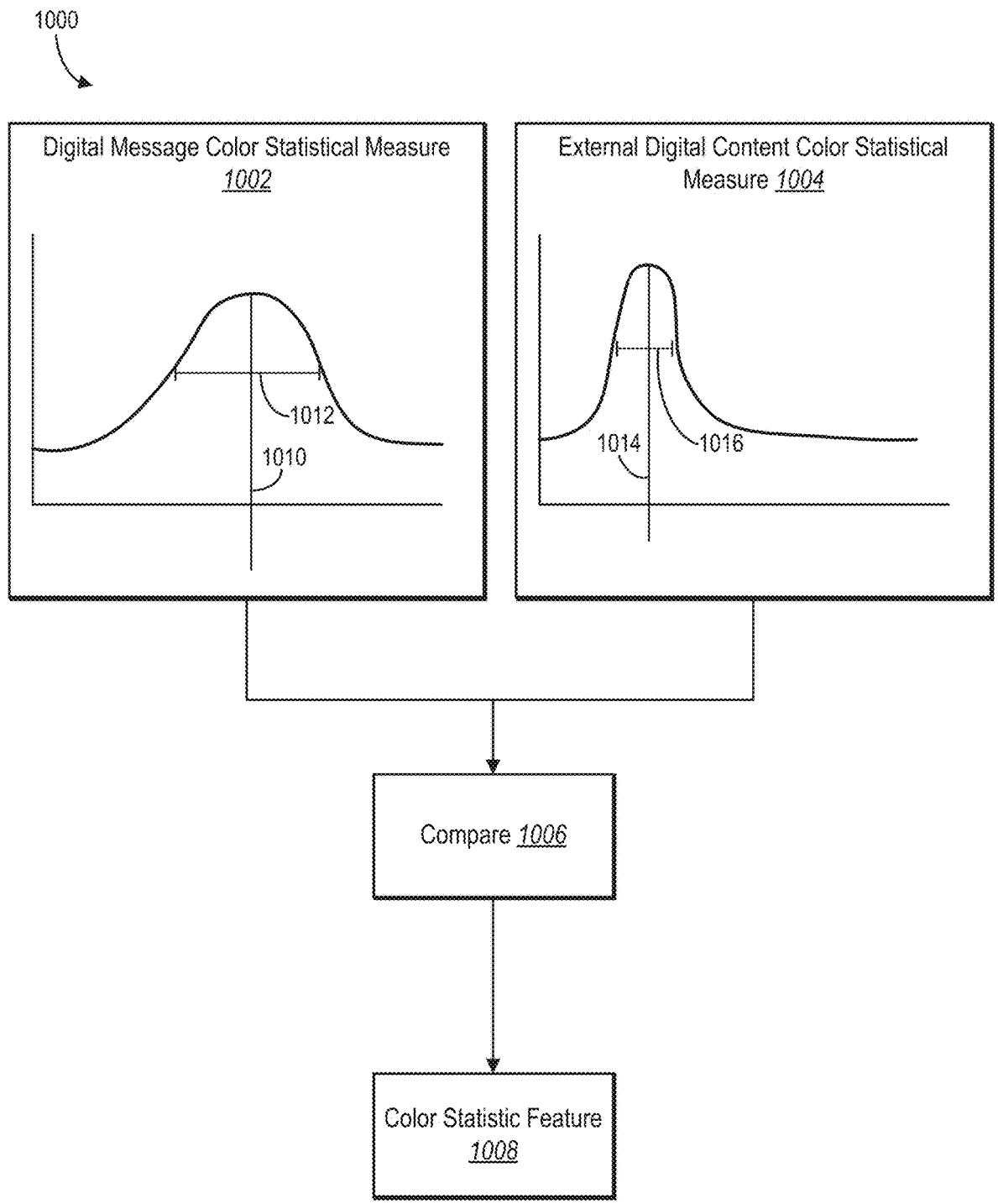
FIG. 10 illustrates generating a color statistic feature in accordance with one or more embodiments.

As discussed above, as part of identifying digital misalignments, the misalignment identification system 118 can determine various alignment classification features 308. A number of alignment classification features 308 will be discussed in the following figures. FIG. 5 illustrates generating a semantic similarity feature. FIG. 6 illustrates generating a common subsequence feature. FIG. 7 illustrates generating a number alignment feature. FIG. 8 illustrates generating URL features. FIG. 9 illustrates generating a visual chunk feature. FIG. 10 illustrates generating a color statistic feature.

As illustrated in FIG. 5, the misalignment identification system 118 generates the critical area feature vector 502 by analyzing the digital message 302. In particular, the misalignment identification system 118 extracts semantic features from the critical area 406 and converts the features to the critical area feature vector 502. To illustrate, the misalignment identification system 118 uses image recognition, optical character recognition, and alternative text tags to extract tags, objects, words, or other features from images found within the critical area 406 (e.g., the misalignment identification system 118 can generate or identify a tag of "shirt" or "clothes" from the image of in the critical area 406). Additionally, the misalignment identification system 118 extracts semantic features from text found within the critical area 406. In at least one embodiment, the semantic features comprise text features. For example, the misalignment identification system 118 can directly extract text features "$24.99 17,193 sold Free Shipping" as semantic features from the critical area 406.

The misalignment identification system 118 extracts semantic features from images and text within the critical area 406 and concatenates the extracted semantic features. The misalignment identification system 118 converts the concatenated extracted features into the critical area feature vector 502. In at least one embodiment, the misalignment identification system 118 uses a doc2vec (or word2vec) algorithm to convert the extracted features into the critical area feature vector 502. In particular, in at least one embodiment, the critical area feature vector 502 comprises a fixed-length feature vector.

The misalignment identification system 118 also analyzes the digital message 302 to generate the global message feature vector 504. In particular, the misalignment identification system 118 extracts a combination of global message features from various elements in the digital message 302. For example, the misalignment identification system 118 can extract semantic global message features from the digital message subject, the message text, message images, and the message links. In some embodiments, the misalignment identification system 118 includes features from the critical area 406 as part of global message features. In other embodiments, the misalignment identification system 118 excludes features from the critical area 406 as part of global message features. The misalignment identification system 118 converts the extracted global message features into the global message feature vector 504. In at least one embodiment, the misalignment identification system 118 uses a doc2vec algorithm (or word2vec algorithm) to convert the global message features into the global message feature vector 504. In at least one embodiment, the global message feature vector 504 is a fixed-length feature vector.

As shown in FIG. 5, the misalignment identification system 118 combines the critical area feature vector 502 and the global message feature vector 504 to generate the expectation feature vector 506. The expectation feature vector 506 approximates semantic expectation (within a semantic feature space) for linked external digital content based on the digital message 302. Because, in at least some embodiments, the critical area feature vector 502 and global message feature vector 504 are both fixed-length feature vectors, the misalignment identification system 118 combines (e.g., weights or averages) the critical area feature vector 502 and the global message feature vector 504 to generate a fixed-length expectation feature vector 506. More particularly, by generating fixed-length feature vectors, the misalignment identification system 118 ensures that the elements of the critical area feature vector 502 correlate to the elements of the global message feature vector 504. Thus, to generate the expectation feature vector 506, the misalignment identification system 118 can combine each of the elements of the critical area feature vector 502 and the global message feature vector 504 (e.g., by blended weighting or averaging) to generate the expectation feature vector 506.

The misalignment identification system 118 generates the external content feature vector 508 by analyzing the external digital content 306. In particular, the misalignment identification system 118 extracts features from various elements found within the external digital content 306, combines them, and converts them into a feature vector. For example, the misalignment identification system 118 can extract external content semantic features from images and text in the external digital content 306. In at least one embodiment, the misalignment identification system 118 uses a doc2vec algorithm (or word2vec algorithm) to convert the external content semantic features into a fixed-length external content feature vector 508. More particularly, the elements of the external content feature vector 508 correspond with the elements of the expectation feature vector 506.

As illustrated in FIG. 5, the misalignment identification system 118 compares 510 the expectation feature vector 506 and the external content feature vector 508 to generate the semantic similarity feature 512. In particular, the misalignment identification system 118 can compare the expectation feature vector 506 and the external content feature vector 508 within a semantic features space to generate the semantic similarity feature 512. Indeed, the misalignment identification system 118 can generate the expectation feature vector 506 and the external content feature vector 508 within a common semantic feature space (e.g., utilizing a doc2vec algorithm) and thus compare the vectors within the semantic feature space to determine the semantic similarity feature 512.

The misalignment identification system 118 can utilize a variety of different approaches to compare the expectation feature vector 506 and the external content feature vector 508. For example, in one or more embodiments, the misalignment identification system 118 uses cosine similarity of two vectors to compare 510 the expectation feature vector 506 and the external content feature vector 508. The misalignment identification system 118 can also utilize a Euclidean distance, squared Euclidean distance, or other similarity measure.

In addition to semantic similarity features, the misalignment identification system 118 can determine a variety of additional alignment classification features. For example, the misalignment identification system 118 can generate a common subsequence feature (e.g., a longest common subsequence feature or a number of threshold length common subsequence feature). If the critical area 406 for the digital link 304 of the digital message 302 and the external digital content 306 share many long common subsequences, the critical area 406 and the external digital content 306 are more likely to align (e.g., the landing page is likely to include the same relevant content as the digital message).

For example, FIG. 6 illustrates a series of acts 600 for generating a common subsequence feature in accordance with one or more embodiments. As illustrated, the series of acts 600 includes act 602 of identifying common subsequences, an act 604 of extracting a number of threshold length common subsequences and the length of the longest common subsequence, and an act 606 of generating the longest common subsequence feature.

In the act 602 of the series of acts 600, the misalignment identification system 118 identifies common subsequences between the critical area 406 of the digital message 302 and the external digital content 306. The misalignment identification system 118 compares text data between the critical area 406 and the external digital content 306 to identify common text strings (i.e., subsequences). For example, as illustrated, the critical area 406 contains a critical area subject 608 and critical area text 610, and the external digital content 306 includes a landing page title 612 and landing page text 614. The misalignment identification system 118 identifies the common subsequence "Christmas Sale!" from the critical area subject 608 and the landing page title 612. Additionally, the misalignment identification system 118 identifies the common subsequence "We know it is the season, so let us help you celebrate!" from the critical area text 610 and the landing page text 614. In at least one other embodiment, the misalignment identification system 118 identifies common subsequences between the entire digital message 302 (i.e., not only from the critical area 406) and the external digital content 306.

As part of the act 604, the misalignment identification system 118 extracts a number of long common subsequences. The misalignment identification system 118 counts the number of common subsequences whose lengths meet a length threshold. In at least one embodiment, the misalignment identification system 118 utilizes a pre-determined length threshold. For example, the misalignment identification system 118 can count the number of common sequences that are at least 30 characters long (or a different threshold length, such as 20 characters or seven words) As illustrated in FIG. 6, "Christmas Sale!" does not qualify as a threshold length common subsequence because it does not satisfy a 30-word common subsequence threshold.

As part of the act 604, the misalignment identification system 118 also extracts the length of the longest common subsequence. For instance, the misalignment identification system 118 identifies the longest common subsequence and extracts its length. In particular, the misalignment identification system 118 can designate a common subsequence with the greatest number of words or characters as the longest common subsequence. For example, as illustrated in FIG. 6, the misalignment identification system 118 identifies "We know it is the season, so let us help you celebrate!" as the longest common subsequence (e.g., 44 non-space characters in length).

In the act 606 of series of acts 600, the misalignment identification system 118 generates a longest common subsequence feature. The misalignment identification system 118 uses the extracted number of long common subsequences and/or the length of the longest common subsequence to generate the longest common subsequence feature.

As used herein, the term "longest common subsequence" refers to a sequence that can be derived from another sequence (e.g., by deleting some elements without changing the order of the remaining elements). For example, the two sequences 15234 and 1324356 would have a longest common subsequence of 123. In some embodiments, the misalignment identification system 118 can determine the longest common matching sequence (e.g., without deleting elements or changing the order of elements). In some embodiments, the misalignment identification system 118 can utilize an alternative measure to determining the common subsequence feature 606. For example, the misalignment identification system 118 can determine an average length of common subsequences. Thus, the misalignment identification system 118 can utilize a variety of measures for the common subsequence feature.

As discussed previously, the misalignment identification system 118 can also generate a number alignment feature. In some circumstances aligned digital messages and external digital content maintain consistency of numbers. For example, price, discount rates, destination, and other kinds of numbers remain the same across digital messages and corresponding external digital content. Accordingly, in some embodiments the misalignment identification system 118 utilizes common numbers as an alignment classification feature. FIG. 7 illustrates a series of acts 700 for generating a number alignment feature in accordance with one or more embodiments. The misalignment identification system 118 performs an act 702 of identifying shared numbers (e.g., critical common numbers) between the critical area 406 in the digital message 302 and the external digital content 306 and an act 704 of generating a number alignment feature.

As part of series of acts 700, the misalignment identification system 118 performs the act 702 of identifying critical numbers. For example, the misalignment identification system 118 analyzes the critical area 406 to identify critical numbers within the critical area 406. As illustrated in FIG. 7, the critical area 406 includes a critical number 706 (i.e., "$25.99"). The misalignment identification system 118 analyzes the external digital content 306 to determine whether the critical number 706 is present in the external digital content 306. As illustrated, the external digital content 306 includes the critical number 706 (i.e., "Price: $25.99). Although not illustrated, the misalignment identification system 118 can also determine that a critical number is not present within the linked external digital content 306.

As part of series of acts 700, the misalignment identification system 118 performs the act 704 of generating the number alignment feature. For example, the misalignment identification system 118 uses the identified critical number to generate a binary or Boolean feature reflecting whether or not the external digital content 306 contains the critical number 706 found in the critical area 406. For example, in at least one embodiment, the number alignment feature for the critical area 406 indicates that the external digital content 306 contains the critical number 706.

The misalignment identification system 118 can utilize a variety of forms of number alignment features. For example, the misalignment identification system 118 can utilize a number of critical numbers that match numbers in the external digital content. In some embodiments, the misalignment identification system 118 utilizes a total number of matching number sequences between a digital message and external digital content. In some embodiments, the misalignment identification system 118 utilizes a total number of non-matching number sequences and/or a ratio or percentage of matching number sequences relative. In sum, the misalignment identification system 118 can utilize a number alignment feature of a variety of different forms.

As discussed above, the plurality of alignment classification features can also include URL features. For example, the misalignment identification system 118 may generate URL features to identify potential redirection. A digital link URL corresponding to a link in the digital message 302 may direct the user to external digital content with an original destination URL. In some instances, the destination URL may expire, be removed, updated, or otherwise changed. Thus, the misalignment identification system 118 extracts a number of features from digital link URLs and destination URLs to identify instances where the destination URL is different from the original destination URL and/or the digital link URL.

FIG. 8 illustrates identifying URL features in accordance with one or more embodiments. As illustrated in FIG. 8, the misalignment identification system 118 performs an act 802 of extracting digital link URLs and destination URLs. As illustrated, the misalignment identification system 118 extracts digital link URL 806a and digital link URL 806b (collectively "digital link URLs 806") from a link 804a and a link 804b (collectively "links 804") from the digital message 302. Additionally, the misalignment identification system 118 accesses the external digital content 306a from the digital link URL 806a and the external digital content 306b from the digital link URL 806b. The misalignment identification system 118 retrieves the destination URL 808a from the external digital content 306a and the destination URL 808b from the external digital content 306b. Thus, the misalignment identification system 118 extracts the digital link URLs 806 and the destination URLs 808 from the digital message 302 and the external digital content 306.

The misalignment identification system 118 generates various features from the digital link URLs 806 and the destination URLs 808. For example, the misalignment identification system 118 extracts a URL length consistency feature, a message URL similarity feature, and a destination URL similarity feature. Each of these features will be discussed in additional detail below.

As illustrated by FIG. 8, the misalignment identification system 118 can analyze URL length 810. The misalignment identification system 118 compares the lengths of the digital link URLs 806 with the length of the destination URLs 808. In particular, the misalignment identification system 118 compares the length of the digital link URL 806a with the length of the destination URL 808a. The misalignment identification system 118 also compares the length of the digital link URL 806b with the destination URL 808b.

Based on comparing the lengths of the digital link URLs 806 and the destination URLs 808, the misalignment identification system 118 generates a URL length consistency feature 816. For example, the URL length consistency feature 816 can comprise a measure of the difference between URL lengths. To illustrate, the URL length consistency feature 816 can include a number of characters reflecting a difference in the number of characters between two URLs. In some embodiments, the URL length consistency feature 816 comprises a binary indicator of whether the difference in length between URLs satisfies a threshold (e.g., a difference greater than ten characters). The URL length consistency feature 816 can take a variety of forms to reflect the consistency in length between a digital link URL and a destination URL.

As mentioned, the URL length consistency feature can provide an indication that destination URLs that have been removed, updated, or otherwise altered. For example, digital link URLs 806 often contain additional information such as tracking IDs or other information to direct a user to the appropriate external digital content 306. If the destination URL 808 is identical to the digital link URL 806, then the associated external digital content 306 likely includes relevant information to the link 804. In contrast, a redirected or updated destination URL 808 will often differ in length from the digital link URL 806 (i.e., be much shorter). More specifically, a redirected or updated destination URL 808 may comprise a domain root or another URL that lacks the additional information present in the digital link URLs 806.

As illustrated in FIG. 8, the misalignment identification system 118 can also generate a message URL similarity feature 818 by counting the number of common digital link URLs 812. The misalignment identification system 118 identifies the number of links 804 in the digital message 302 that share the same digital link URL 806. For example, as illustrated in FIG. 8, the misalignment identification system 118 determines that the digital link URL 806a matches the digital link URL 806b. Based on this determination, the misalignment identification system 118 generates the message URL similarity feature 818 indicating that two of the links 804 in the digital message 302 share a common digital link URL 806.

As illustrated in FIG. 8, the misalignment identification system 118 can generate a destination URL similarity feature 820 by identifying a number of common destination URLs 814. The misalignment identification system 118 identifies the number of destination URLs 808 that are the same. For example, as illustrated in FIG. 8, the misalignment identification system 118 determines that the destination URL 808a matches the destination URL 808b. Based on this determination, the misalignment identification system 118 generates the destination URL similarity feature 820 indicating that two of the destination URLs 808 are the same.

As illustrated by FIG. 8, the misalignment identification system 118 combines the URL length consistency feature 816, the message URL similarity feature 818, and the destination URL similarity feature 820 to generate the URL features 822. For example, the misalignment identification system 118 can concatenate vectors reflecting the URL length consistency feature 816, the message URL similarity feature 818, and the destination URL similarity feature 820.

As discussed previously, the misalignment identification system 118 can generate a visual chunk feature as one of the plurality of alignment classification features. FIG. 9 illustrates a series of acts 900 for generating a visual chunk feature in accordance with one or more embodiments. The series of acts 900 includes an act 902 of generating a digital image of the external digital content, an act 904 of processing the digital image to identify visual chunks, an act 906 of determining number of visual chunks and the size and position of a target visual chunk, and an act 908 of generating a visual chunk feature.

As illustrated in FIG. 9, the series of acts 900 includes the act 902 of generating a digital image of the external digital content. The misalignment identification system 118 accesses a digital image of the external digital content. In at least one embodiment, the misalignment identification system 118 accesses or generates a digital screenshot of the external digital content.

The series of acts 900 includes the act 904 of processing the digital image to identify visual chunks. As part of processing the digital image, the misalignment identification system 118 manipulates the digital image to reveal visual chunks. For example, in relation to FIG. 9 the misalignment identification system 118 converts the digital image into a grayscale image, whites out pixels whose pixel intensity is higher than a predetermined threshold (i.e., lighter pixels), and repeats a blurring and sharpening process to reveal visual chunks.

In particular, the misalignment identification system 118 converts pixels in the grayscale image whose pixel intensity is higher than a predetermined threshold to white. For example, for pixel values that range from 0 (black) to 255 (white), the misalignment identification system 118 can designate a pixel intensity value as 200 as the pixel threshold. The misalignment identification system 118 converts pixels whose intensity is higher than the threshold into white pixels. The misalignment identification system 118 can repeat a blurring and sharpening process to reveal visual chunks. In at least one embodiment, the misalignment identification system 118 performs the blurring and sharpening process by repeating a dilation method and an eroding method to expand and erode the area covered by white pixels. Moreover, the misalignment identification system 118 applies a Gaussian blur to smooth the border between white and dark pixels. The misalignment identification system 118 identifies visual chunks by utilizing a contour method (e.g., find contours from the OpenCV library).

As shown in FIG. 9, the misalignment identification system 118 performs the act 906 of determining (1) a number of visual chunks and (2) the size and position of a target visual chunk. By determining these features of the visual chunks, the misalignment identification system 118 can identify characteristics of the external digital content 306. For example, a lack of visual chunks or visual chunks positioned around a central area might indicate that the external digital content 306 includes blank page and/or a pop-up window.

The misalignment identification system 118 can identify a target visual chunk using various methods. For instance, the misalignment identification system 118 can select the target visual chunk based on size (e.g., select the largest visual chunk), position (e.g., the chunk closest to the center), the shape, and/or proximity to other chunks (e.g., the most central chunk in a cluster of chunks). The misalignment identification system 118 can extract a number of features from the identified target visual chunk including the size, location, or shape of the target visual chunk.

The misalignment identification system 118 can also determine a color statistic feature as one of the plurality of alignment classification features. FIG. 10 illustrates a process 1000 for generating a color statistic feature in accordance with one or more embodiments. As shown, the misalignment identification system 118 can generate a color statistic feature by comparing a digital message color statistical measure 1002 and an external digital content color statistical measure 1004 to generate a color statistic feature 1008.

As illustrated in FIG. 10, the misalignment identification system 118 generates a digital message color statistical measure 1002. In relation to FIG. 10, the misalignment identification system 118 accesses a digital image of the digital message 302 and generates a digital message color average 1010 and a digital message color standard deviation 1012 for the digital message 302. In at least one embodiment, the misalignment identification system 118 determines red, green, and blue (RGB) pixel values for the digital message 302. The misalignment identification system 118 calculates an RGB mean and an RGB standard deviation for the digital message 302.

Similarly, as shown in FIG. 10, the misalignment identification system 118 generates an external digital content color average 1014 and an external digital content color standard deviation 1016. In at least one embodiment, the misalignment identification system 118 calculates an RGB mean and an RGB standard deviation for the external digital content 306.

As shown in FIG. 10, the misalignment identification system 118 compares 1006 the digital message color statistical measure 1002 with the external digital content color statistical measure 1004 to generate the color statistic feature 1008. The misalignment identification system 118 can utilize various methods to perform this comparison. For example, the misalignment identification system 118 can calculate a difference between the digital message color statistical measure 1002 and the external digital content color statistical measure 1004. Additionally, the misalignment identification system 118 can determine a ratio of the digital message color statistical measure 1002 to the external digital content color statistical measure 1004.

As illustrated in FIG. 10, the digital message color standard deviation 1012 and the digital message color average 1010 represent the visual style/composition of the digital message 302, and the external digital content color standard deviation 1016 and the external digital content color average 1014 represents the visual style/composition of the external digital content 306. The color statistic feature 1008 thus indicate whether or not the digital message 302 and the external digital content 306 contain consistent visual styles and compositions. For example, external digital content 306 consisting of an error landing page containing a black and white error notification will likely have a digital message color standard deviation 1012 and a digital message color average 1010 that differs from the digital message color average 1010 and the digital message color standard deviation 1012 of a digital message that includes colored images.

Although FIG. 10 illustrates generating a color statistic feature using color standard deviation and color average of a digital message and external digital content, the misalignment identification system 118 can also utilize additional color statistical measures to generate the color statistic feature 1008. For example, the misalignment identification system 118 can determine the mean, variance, range, mean absolute difference, interquartile range, or coefficient of variation of the digital message and the external digital content. The misalignment identification system 118 can compare these various color statistics of the digital message and the external digital content.

Figure 11A:
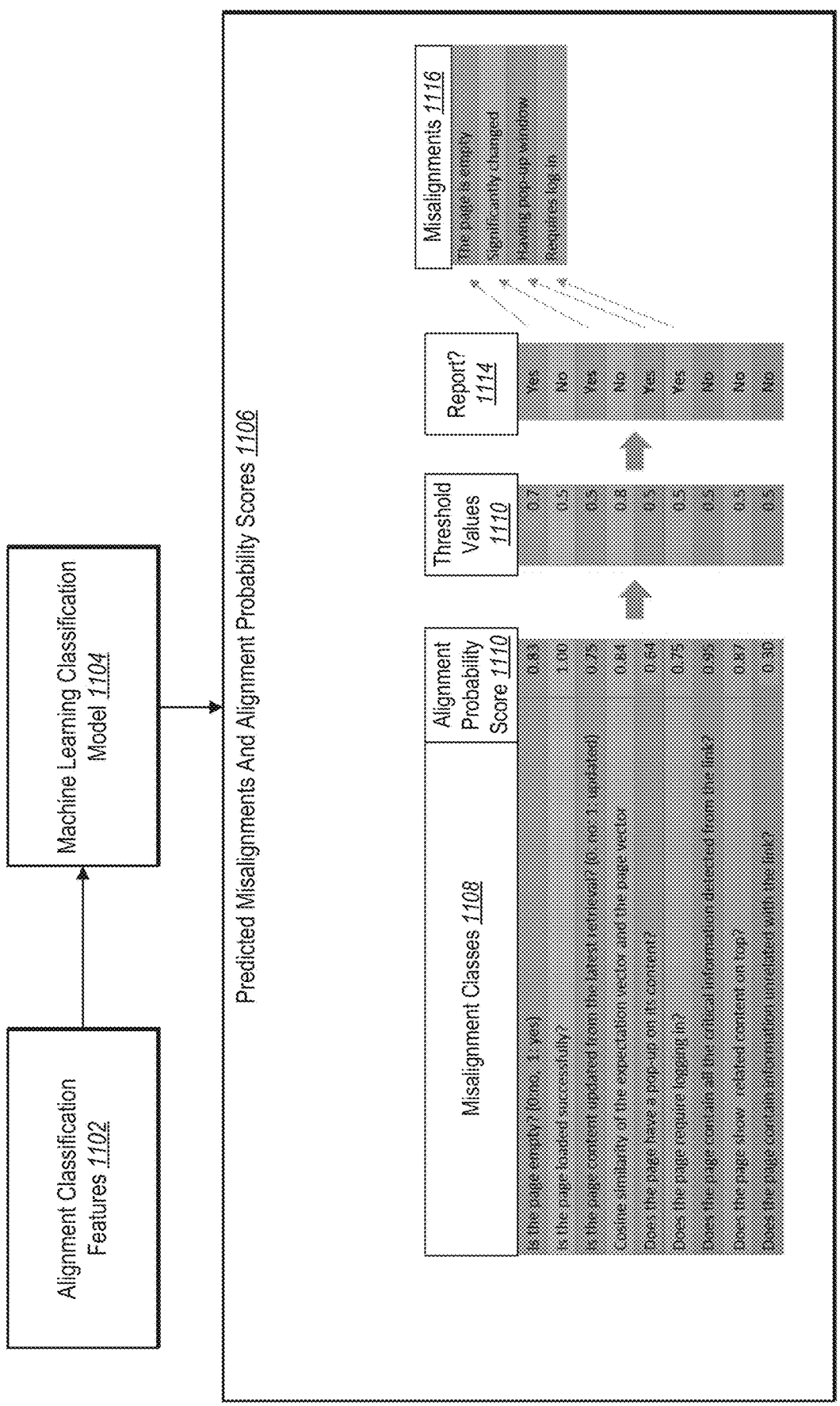
FIGS. 11A-11B illustrate utilizing and training a machine learning classification model to predict misalignments and alignment probability scores in accordance with one or more embodiments.
Figure 11B:
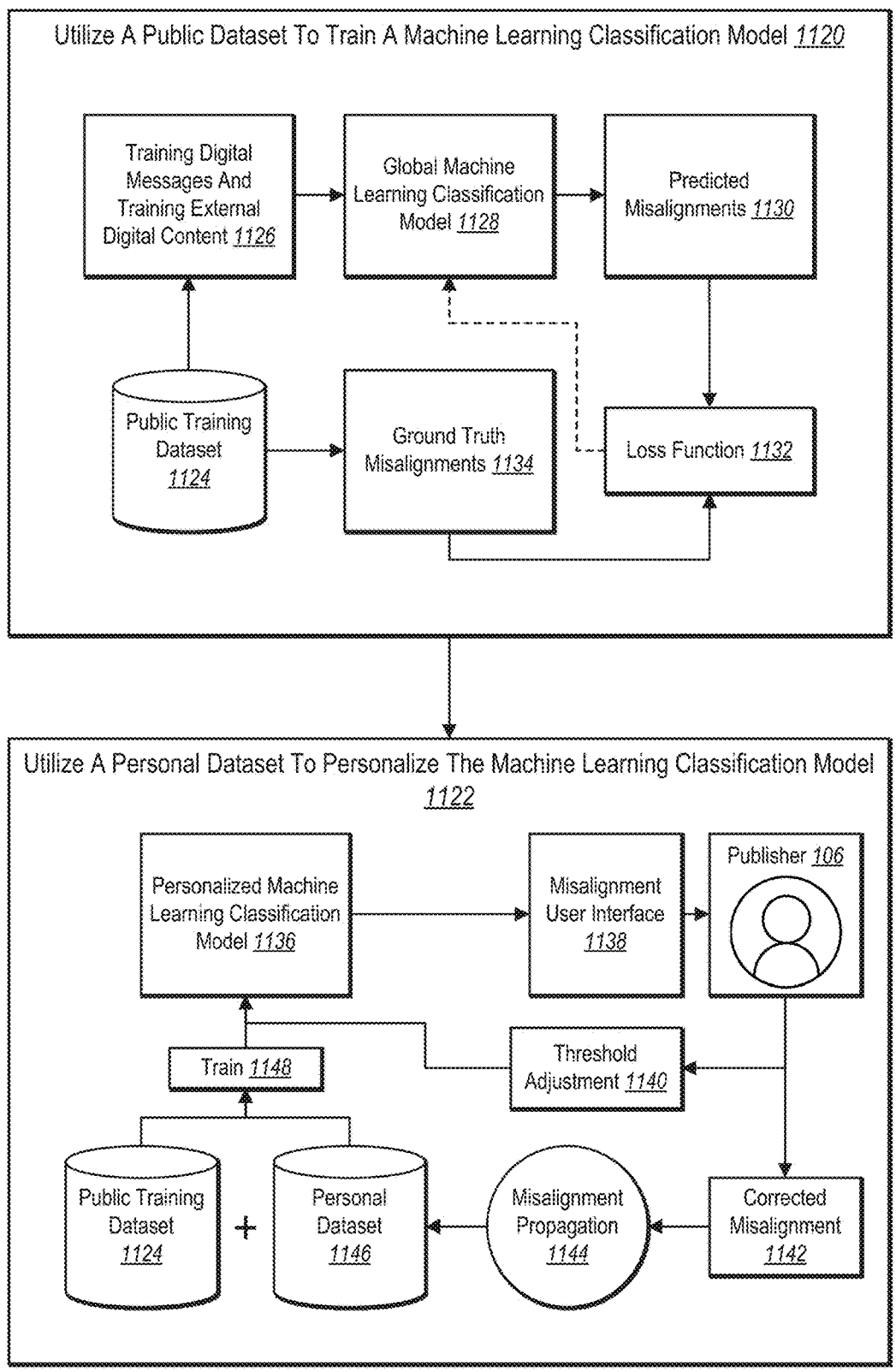

As discussed previously, the misalignment identification system 118 can estimate alignment probability scores for a number of misalignment classes based on the extracted plurality of alignment classification features. Using the misalignment classes and the alignment probability scores, the misalignment identification system 118 can determine misalignments that exist between the digital link 304 in the digital message 302 and the external digital content 306. FIGS. 11A-11B illustrate generating misalignments and alignment probability scores in accordance with one or more embodiments. FIG. 11A illustrates an overview for predicting misalignments and alignment probability scores using a machine learning classification model. FIG. 11B illustrates utilizing public and personal datasets to train the machine learning classification model.

As discussed previously, FIG. 11A illustrates an overview for generating predicted misalignments and alignment probability scores. In particular, the misalignment identification system 118 uses alignment classification features 1102 as an input into a machine learning classification model 1104. The machine learning classification model 1104 generates predicted misalignments and alignment probability scores 1110.

As illustrated in FIG. 11A, the misalignment identification system 118 uses the alignment classification features 1102 as input to the machine learning classification model 1104. The alignment classification features 1102 comprise one or more of the plurality of alignment classification features extracted from the digital link 304, the digital message 302, and the external digital content 306. For example, the alignment classification features 1102 can include the semantic similarity feature, the longest common subsequence feature, the number alignment feature, the URL features, the visual chunk feature, and/or the color statistic feature.

The misalignment identification system 118 inputs the alignment classification features 1102 into the machine learning classification model 1104 comprising a pre-trained model. The machine learning classification model 1104 can comprise a variety of machine learning models. For example, the machine learning classification model 1104 can comprise a random decision forest algorithm, deep learning algorithms, or other models described herein.

As illustrated in FIG. 11A, the misalignment identification system 118 uses the machine learning classification model 1104 to generate predicted misalignments and the alignment probability scores 1106. In particular, the misalignment identification system 118 generates alignment probability scores 1110 for various misalignment classes 1108. The misalignment identification system 118 compares the alignment probability scores 1110 with corresponding threshold values 1112 to determine whether or not to report 1114 misalignments 1116.

As illustrated in FIG. 11A, the misalignment identification system 118 generates alignment probability scores 1110 for a number of misalignment classes 1108. By utilizing a plurality of alignment classification features 1102, the misalignment identification system 118 is not limited to a binary determination of whether or not the digital link 304, the digital message 302, and the external digital content 306 contain a misalignment. Rather, the misalignment identification system 118 uses the plurality of alignment classification features 1102 to infer alignment probability scores 1110 for misalignment classes 1108. In at least one embodiment, the misalignment classes 1108 include the following determinations: (1) is the page empty? (i.e., empty classification) (2) is the page loaded successfully? (i.e., loading error classification) (3) is the page content updated from the latest retrieval? (4) cosine similarity of the expectation feature vector 506 and the external content feature vector 508 (i.e., semantic relevance classification); (5) does the page have a pop-up on its content? (i.e., popup classification) (6) does the page require logging in? (i.e., login classification) (7) does the page contain the critical information detected from the link? (i.e., missing critical information classification) (8) does the page show related content on top? and (9) does the page contain information unrelated with the link? The misalignment identification system 118 can identify other misalignment classes.

As illustrated in FIG. 11A, the misalignment identification system 118 utilizes the machine learning classification model 1104 to infer the alignment probability scores 1110. In particular, the alignment probability scores 1110 indicate the likelihood that a misalignment of a particular misalignment class 1108 exists between the digital link 304 in the digital message 302 and the external digital content 306.

As further illustrated in FIG. 11A, the misalignment identification system 118 associates a threshold value of the threshold values 1112 with each of the misalignment classes 1108. The threshold values 1112 can comprise values predetermined by the misalignment identification system 118. As will be discussed in additional detail below, the misalignment identification system 118 can adjust the threshold values 1112 based on publisher input. The misalignment identification system 118 uses the threshold values 1112 to determine misalignments or which misalignments to report to the publisher. Thus, by adjusting the threshold values 1112, the misalignment identification system 118 can report misalignments using various sensitivities. For example, the misalignment identification system 118 can determine, via user input, that the threshold value 1112 of 0.5 for the misalignment class 1108 "does the page contain information unrelated with the link?" results in an excessive number of reported misalignments. Based on this determination, the misalignment identification system 118 can adjust the threshold value 1112 to a higher value (e.g., 0.75) to decrease the sensitivity and number of reported misalignments.

The misalignment identification system 118 compares the alignment probability scores 1110 with the threshold values 1112 to determine which misalignments to report 1114. In particular, the misalignment identification system 118 reports misalignments for the misalignment classes 1108 whose alignment probability scores 1110 satisfy the associated threshold values 1112 depending on the misalignment class 1108. For example, as illustrated in FIG. 11A, the misalignment identification system 118 determines that the alignment probability score 1110 for the misalignment class 1108 "Is the page empty?" is 0.83. Based on determining that the alignment probability score 1110 meets or exceeds the threshold value 0.7, the misalignment identification system 118 determines to report a misalignment of the appropriate misalignment class. In contrast, the misalignment identification system 118 reports various other misalignments based on the corresponding alignment probability score falling below the threshold value 1112. For example, the misalignment identification system 118 infers an alignment probability score 1110 of 1.00 for the misalignment class 1108 "Is the page loaded successfully?" Based on determining that the alignment probability score meets and exceeds the associated threshold value (e.g., 0.5), the misalignment identification system 118 determines not to report a misalignment of the corresponding misalignment class.

As illustrated in FIG. 11A, the misalignment identification system 118 identifies and reports the misalignments 1116. The misalignments 1116 comprise misalignment classes 1108 for which the alignment probability scores 1110 meet the threshold values 1112. The misalignment identification system 118 presents the misalignments 1116 to the publisher via a misalignment identification user interface. Additional detail regarding a misalignment identification user interface will be discussed below (e.g., with respect to FIGS. 12-14C).

As discussed above, the misalignment identification system 118 can utilize a public dataset and a personal dataset to train a machine learning classification model. FIG. 11B illustrates how the misalignment identification system 118 utilizes a public dataset to train a machine learning classification model 1120 and utilizes a personal dataset to personalize the machine learning classification model 1122.

As illustrated in FIG. 11B, the misalignment identification system 118 can utilize a public dataset to train a machine learning classification model 1120. In particular, the misalignment identification system 118 accesses training digital messages and training external digital content 1126 from a public training dataset 1124. The misalignment identification system 118 uses the training digital messages and training external digital content 1126 as input to a global machine learning classification model 1128. The global machine learning classification model 1128 generates predicted misalignments 1130 (e.g., predicted alignment probability scores). The misalignment identification system 118 accesses ground truth misalignments 1134 from the public training dataset 1124. The misalignment identification system 118 compares the predicted misalignments 1130 and the ground truth misalignments 2234 (e.g., by applying a loss function 1132. Moreover, the misalignment identification system 118 can tune/train the global machine learning classification model 1128 based on the comparison. For example, the misalignment identification system 118 can modify internal parameters of layers of a neural network to reduce the measure of loss from applying the loss function 1132.

The misalignment identification system 118 can regularly update the public training dataset 1124 to continuously train the global machine learning classification model 1128. For example, the misalignment identification system 118 can continue to receive the training digital messages and training external digital content 1126 and the training misalignments and training alignment probability scores 1134 from various sources.

The misalignment identification system 118 can utilize the machine learning classification model as a pretrained model. For example, the misalignment identification system 118 can present the global machine learning classification model 1128 for use to a publisher who does not yet have a personal training dataset. The misalignment identification system 118 can further personalize the machine learning classification model using a personal dataset.

As further illustrated in FIG. 11B, the misalignment identification system 118 can utilize a personal dataset to personalize the machine learning classification model 1122. For example, the misalignment identification system 118 can further personalize the machine learning classification model by receiving feedback from the publisher 106 via a misalignment user interface 1138. For instance, the personalized machine learning classification model 1136 receives two types of feedback from the publisher 106. The publisher 106 can enter a threshold adjustment 1140 or a corrected misalignment 1142 via the misalignment user interface 1138. The misalignment identification system 118 can automatically adjust the threshold value by entering the threshold adjustment 1140. Additionally, upon receiving the corrected misalignment 1142, the misalignment identification system can perform a misalignment propagation 1144 and add the corrected misalignment 1142 to the personal dataset 1146. The misalignment identification system 118 uses both the personal dataset 1146 and the public training dataset 1124 to train 1148 the personalized machine learning classification model 1136.

The misalignment identification system 118 can receive the threshold adjustment 1140 and automatically adjust a threshold value. For example, as part of the misalignment user interface 1138, the misalignment identification system 118 can present the alignment probability scores corresponding to the one or more misalignments as well as the threshold values associated with the misalignment classes. The publisher 106 can adjust the threshold values to adjust the identified misalignments. The misalignment identification system 118 can store the threshold adjustment 1140 and apply the stored threshold adjustment 1140 to future applications of the personalized machine learning classification model 1136. Thus, the misalignment identification system 118 can store and apply threshold preferences of the publisher 106.

Additionally, the misalignment identification system 118 can enter the corrected misalignment 1142 to the personal dataset 1146. For instance, if the publisher 106 disagrees with the class of the misalignment predicted by the personalized machine learning classification model 1136, the publisher 106 can enter a corrected misalignment 1142. For example, the publisher 106 can enter the corrected misalignment 1142 that indicates that rather than an empty page, the external digital content has a popup window. The misalignment identification system 118 can utilize the corrected misalignment 1142 as a ground truth misalignment and train the machine learning model 1120 utilizing the ground truth misalignment the predicted misalignment and the digital message/the external content corresponding to the predicted misalignment.

In addition to corrections to predicted misalignments, the misalignment identification system 118 can utilize a variety of user interactions that reflect a measure of accuracy to train the machine learning model 1120. For example, if a publisher views but does not revise misalignment label, the misalignment identification system 118 can treat the interaction as an implicit affirmation, and add the predicted misalignment to the personal dataset (as a ground truth misalignment).

As illustrated, the misalignment identification system 118 receives the corrected misalignment 1142 and performs the misalignment propagation 1144. For example, through the misalignment propagation 1144, the misalignment identification system 118 can efficiently utilize a single corrected misalignment 1142 to correct similar misalignments. In at least one embodiment, as part of performing the misalignment propagation 1144, the misalignment identification system employs mixed-initiative misalignment propagation to fix similar links. For instance, if the publisher 106 enters the corrected misalignment 1142, the misalignment identification system 118 disambiguates the intent of the publisher 106 by showing similar links and the associated similar misalignments from the local dataset and asks the publisher 106 whether the similar misalignments should be fixed as well. The misalignment identification system 118 gives the publisher 106 the option to choose to leave the similar misalignments, correct the similar misalignments altogether, or correct only some of the similar misalignments. The misalignment identification system 118 can quickly add all or some of the similar misalignments to the personal dataset 1146. Additionally, the misalignment identification system 118 can identify misalignments that have a greater impact on the personalized machine learning classification model 1136. For example, the misalignment identification system 118 can identify links with misalignment classes where the alignment probability scores are close to the corresponding threshold value. In other words, the misalignment identification system 118 identifies links with misalignment classes that are on the border of identified as a misalignment or not. By identifying links with questionable misalignment determinations and receiving input from the publisher 106, the misalignment identification system 118 can maximize the impact of borderline cases.

As part of utilizing the personal dataset to personalize the machine learning classification model 1122, the misalignment identification system 118 uses both the public training dataset 1124 and the personal dataset 1146 to train 1148 the personalized machine learning classification model 1136.

Figure 12A:
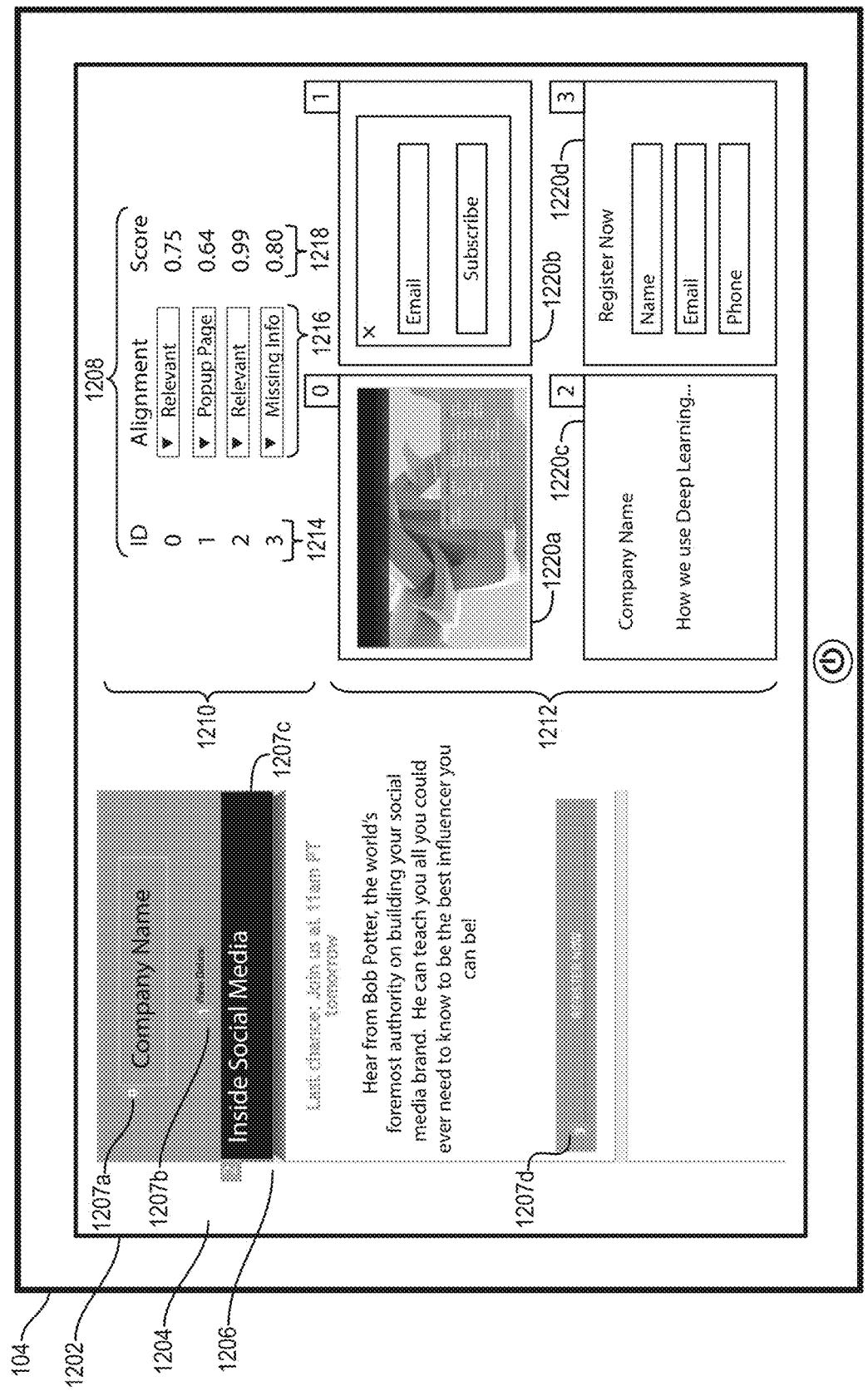
Figure 13:
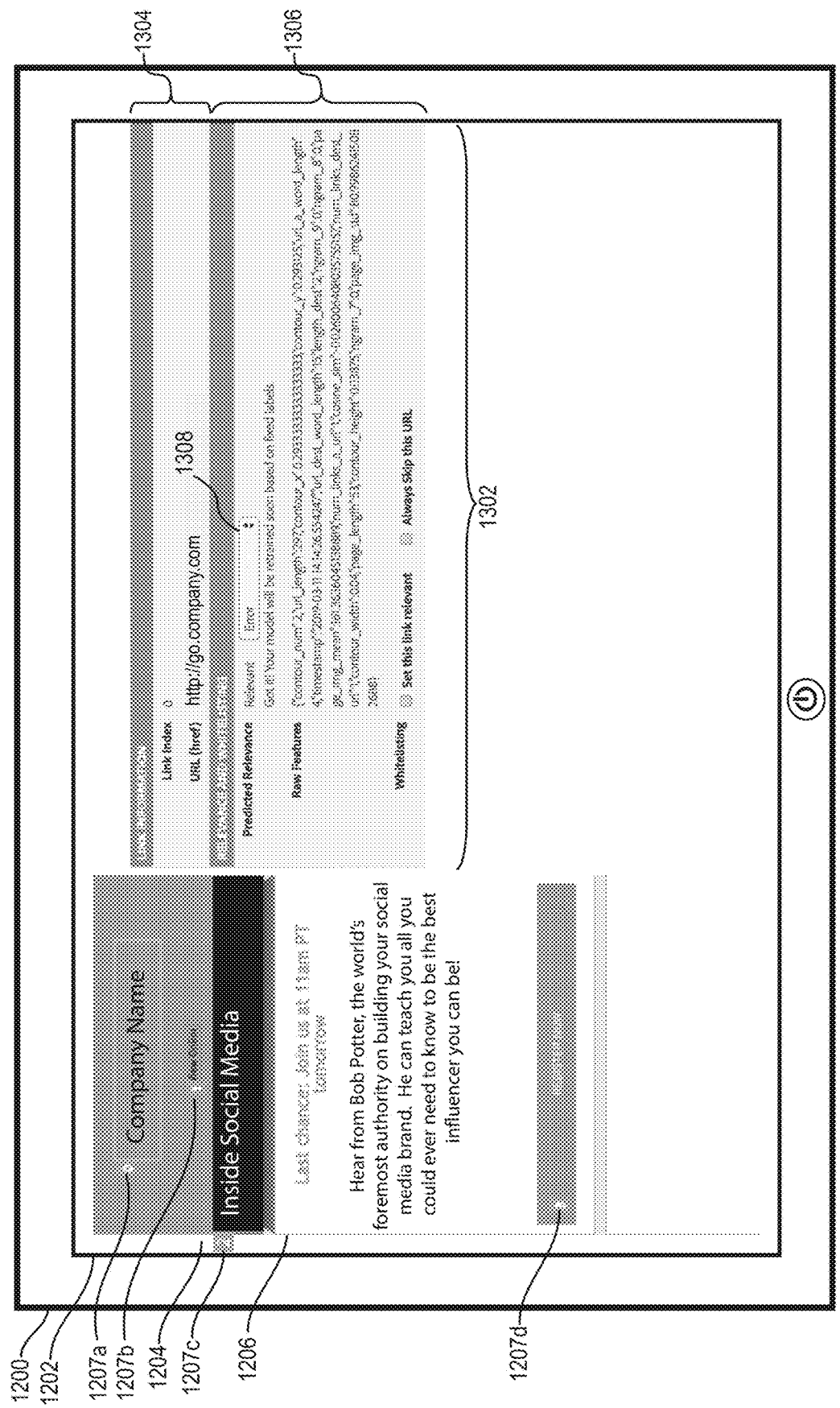
FIG. 13 illustrates an example misalignment identification user interface for a digital link in accordance with one or more embodiments.

As discussed previously, the misalignment identification system 118 can present a misalignment identification user interface at the publisher client device 104. The misalignment identification user interface presents the misalignments 1116 and the alignment probability scores 1110. Additionally, the misalignment identification system 118 can receive, via the misalignment identification user interface, the corrected misalignments 1142 and the threshold adjustments 1140. FIGS. 12A-14C illustrate a series of example misalignment identification user interfaces and elements that can be found within the misalignment identification user interfaces. FIG. 12A illustrates a misalignment identification user interface 1204 with a landing pages summary 1208 that displays misalignment information for the digital links in a digital message. FIG. 12B illustrates example threshold adjustment user interface elements 1222 that can be a part of the misalignment identification user interface 1204. FIG. 13 illustrates a misalignment identification user interface 1204 with a digital link summary 1302 that displays misalignment information for a particular digital link in the digital message. FIGS. 14A-14B illustrate a series of misalignment correction user interface elements 1402 that can be a part of the digital link summary 1302.

As mentioned above, FIG. 12A illustrates the misalignment identification user interface 1204 with the landing pages summary 1208 that displays misalignment information for the digital links in a digital message in accordance with one or more embodiments. As illustrated in FIG. 12A, the misalignment identification system 118 presents the misalignment identification user interface 1204 via a display screen 1202 on the publisher client device 104. The misalignment identification user interface 1204 includes a digital message display 1206 and a landing pages summary 1208. The landing pages summary 1208 includes alignment information 1210 and landing page information 1212.

As illustrated in FIG. 12A, the misalignment identification user interface 1204 includes the digital message display 1206. The digital message display 1206 comprises a visual representation of the digital message 302. The digital message display 1206 also includes link boxes 1207*a-d* that illustrate digital links within the selected digital message. Additionally, the link boxes 1207*a-d* facilitate reference with the landing pages summary 1208.

The landing pages summary 1208 in FIG. 12A displays misalignment information and external landing pages (i.e., external digital content) corresponding to the digital links in the digital message shown in the digital message display 1206. In particular, the landing pages summary 1208 includes the alignment information 1210 for digital links found in the digital message illustrated by the digital message display 1206. The alignment information 1210 includes digital link IDs 1214 that correspond to the link boxes 1207*a-d*, misalignment indicators 1216, and alignment probability scores 1218. As illustrated in FIG. 12A, the misalignment indicators 1216 comprise interactive elements (e.g., drop-down elements) that allow the publisher to enter a measure of accuracy with regard to predicted misalignments.

The landing pages summary 1208 also includes the landing page information 1212. The landing page information 1212 displays external landing pages (e.g., snapshots of external landing pages) corresponding to links in the digital message in the digital message display 1206. In at least one other embodiment, the landing page information 1212 can include threshold adjustment user interface elements in addition to or instead of the landing page thumbnails 1220*a-c*.

As discussed, the misalignment identification user interface 1204 can include threshold adjustment user interface elements. FIG. 12B illustrates example threshold adjustment user interface elements 1222 that can be a part of the landing pages summary 1208. In particular, FIG. 12B illustrates a global threshold display 1224, an individual misalignment threshold display 1226, and a link threshold adjustment element 1228. Each of these elements is discussed below.

The threshold adjustment user interface elements 1222 of FIG. 12B include the global threshold display 1224. The global threshold display 1224 presents, to the publisher, identified misalignments. The global threshold display 1224 includes a global threshold adjustment element 1230. The misalignment identification system 118 can receive publisher input via the global threshold adjustment element 1230 to adjust threshold values to be applied to misalignment classes. In at least one embodiment, based on publisher interaction with the global threshold adjustment element 1230, the misalignment identification system 118 alters each of the threshold values for the misalignment classes by a predetermined increment. Thus, based on user interaction with the global threshold adjustment element 1230, the misalignment identification system 118 can change alignment thresholds and the number of reported misalignments.

The threshold adjustment user interface elements 1222 also includes the individual misalignment threshold display 1226. The individual misalignment threshold display 1226 presents the number of misalignments by misalignment class and also allows the publisher to adjust the threshold values applied to specific misalignment classes. As illustrated in FIG. 12B, the individual misalignment threshold display 1226 includes individual misalignment threshold elements 1232 for adjusting the threshold values applied to the corresponding misalignment class.

As illustrated in FIG. 12B, the threshold adjustment user interface elements 1222 also includes a link threshold adjustment element 1228. The misalignment identification system 118 can present the link threshold adjustment element 1228 in response to a publisher selection of a particular digital link. The link threshold adjustment element 1228 includes an indication of the misalignment reported for the digital link as well as an option to view more or fewer cases. For example, based on interaction with the selectable "more" element, the misalignment identification system 118 adjusts the threshold value corresponding to the inconsistent information misalignment class to report more misalignments of the inconsistent information misalignment class.

As illustrated in FIG. 12B, the threshold adjustment user interface elements 1222 are presented together as part of the landing pages summary 1208 of the misalignment identification user interface 1204. In one or more embodiments, the misalignment identification system 118 can present the threshold adjustment user interface elements 1222 in one or more additional user interfaces. The misalignment identification system 118 can present one, a combination, or all of the threshold adjustment user interface elements 1222 in a single user interface. For example, it at least one embodiment, the misalignment identification system 118 presents the link threshold adjustment element 1228 as part of the link misalignment identification user interface of FIG. 13.

FIGS. 12A-12B illustrate the misalignment identification user interface 1204 with general misalignment information for the digital links in a digital message via the landing pages summary 1208. Based on user selection of a specific link, the misalignment identification system 118 can present a link misalignment identification user interface that presents misalignment information specific to the selected link. FIG. 13 illustrates a misalignment identification user interface 1204 with a digital link summary 1302 that includes misalignment information for the selected link in accordance with one or more embodiments. The digital link summary 1302 includes digital link information 1304 and digital link misalignment information 1306.

As illustrated in FIG. 13, and as similarly illustrated in FIG. 12A, the misalignment identification user interface 1204 includes the digital message display 1206 with the link boxes 1207*a-d*. Based on detecting selection of one of the link boxes 1207*a-d*, the misalignment identification system 118 can update a portion of the misalignment identification user interface 1204 to display misalignment information for the link corresponding to the selected link box.

The misalignment identification user interface 1204 illustrated in FIG. 13 includes the digital link summary 1302 that displays misalignment information specific to a particular link. The digital link summary 1302 includes digital link information 1304 and digital link misalignment information 1306.

As illustrated in FIG. 13, the digital link misalignment information 1306 includes misalignment information specific to the selected digital link. The digital link misalignment information 1306 includes the misalignment indicator 1308 displaying the misalignment determined by the misalignment identification system 118 (e.g., an "Error" misalignment). In at least one embodiment, the misalignment indicator 1308 comprises an interactive element (e.g., a drop-down menu) that allows publisher to enter a corrected misalignment. Although not illustrated, the digital link misalignment information 1306 can include the alignment probability score associated with the reported misalignment. Additionally, the digital link misalignment 1306 can include raw features and whitelisting options. Based on user interaction with the whitelisting options (e.g., "Set this link relevant" and "Always Skip this URL"), the misalignment identification system 118 can adjust future user interface display. For example, based on interaction with the selectable "Always Skip this URL" element, the misalignment identification system stops reporting misalignments for the selected digital link URL.

As discussed previously, the misalignment identification user interface 1204 can include a misalignment correction user interface element to enter the corrected misalignments 1142. FIGS. 14A-14C illustrate the progression of a misalignment correction user interface element 1402 in accordance with one or more embodiments. In at least one embodiment, the misalignment correction user interface element 1402 can be included in the digital link summary 1302. In at least one other embodiment, the misalignment correction user interface element 1402 can be a part of its own graphical user interface.

FIG. 14A illustrates the misalignment correction user interface element 1402 with an incorrect misalignment indication element 1404. The incorrect misalignment indication element 1404 can comprise other types of interactive elements such as a drop-down menu. Based on detecting publisher interaction with the incorrect misalignment indication element 1404, the misalignment identification system 118 updates the misalignment correction user interface element 1402 to display misalignment option elements.

FIG. 14B illustrates the misalignment correction user interface element 1402 with misalignment option elements 1406. The misalignment option elements 1406 include various selectable misalignment classes. The publisher can select one of the misalignment option elements 1406 to indicate the correct misalignment. Although the misalignment option elements 1406 in FIG. 14B are displayed as a list, the misalignment identification system can present the misalignment option elements 1406 as part of a drop-down menu, checklist, or other interactive element. misalignment identification system FIG. 14C illustrates the misalignment correction user interface element 1402 in response to a selection of one of the misalignment option elements 1406. For example, the misalignment identification system 118 provides, via the misalignment correction user interface element 1402, an option to propagate the corrected misalignment. Upon detecting selection of a corrected misalignment 1142, the misalignment identification system 118 updates the misalignment correction user interface element 1402 to include a misalignment propagation element 1408. The misalignment propagation element 1408 provides the publisher with the option to fix all or individual similar links. The misalignment identification system 118 uses the received input to perform the misalignment propagation 1144 as discussed previously in FIG. 11B.

Figure 15:
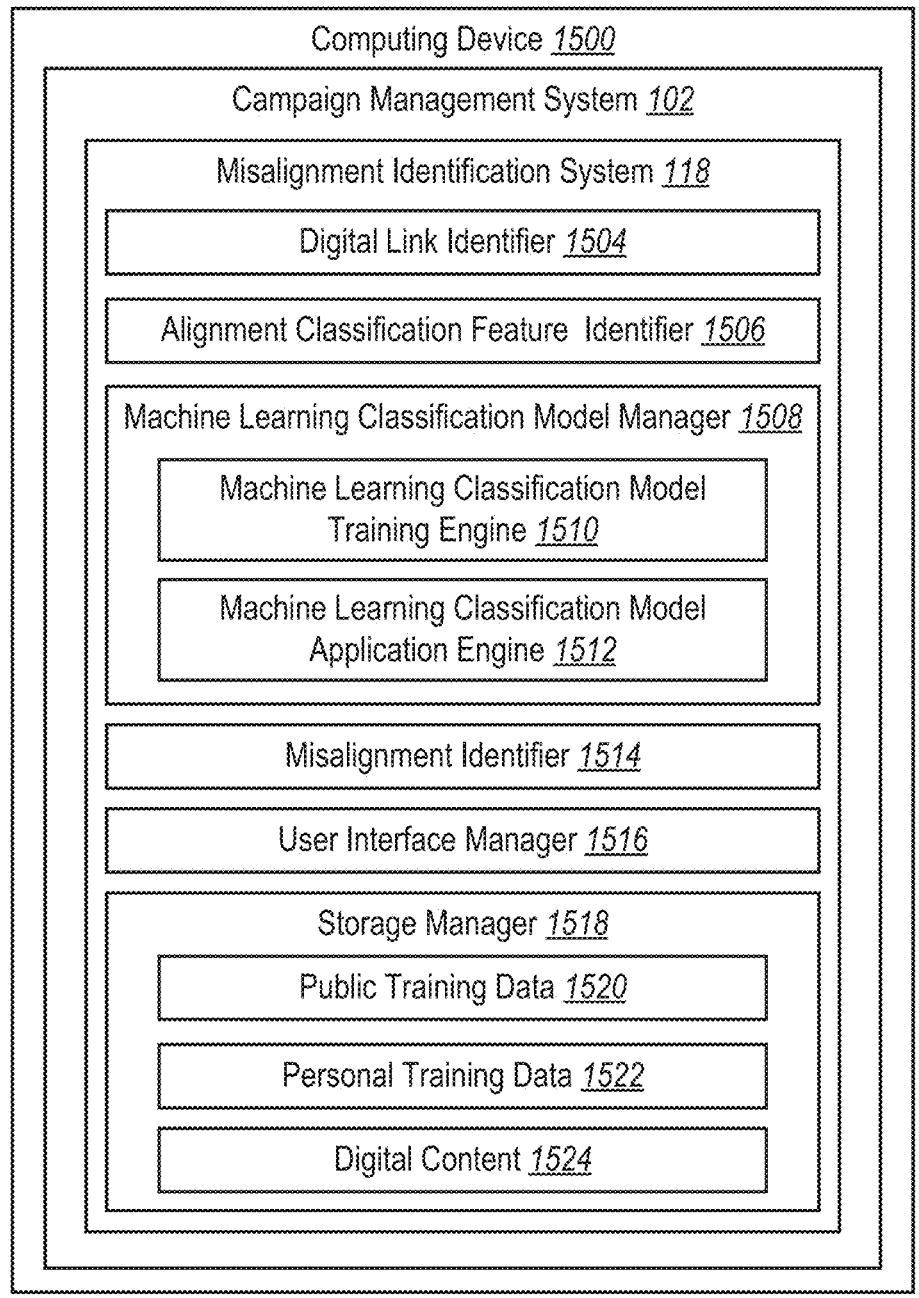
FIG. 15 illustrates a schematic diagram of the misalignment identification system of FIG. 1 in accordance with one or more embodiments.

FIG. 15 illustrates a schematic diagram of an embodiment of the misalignment identification system 118. As shown, the campaign management system 102 can be part of computing device 1500 (e.g., the publisher client device 104 and/or the server device(s) 112). Additionally, the misalignment identification system 118 can be a part of the campaign management system 102. The misalignment identification system 118 can include, but is not limited to, a digital link identifier 1504, an alignment classification feature identifier 1506, a machine learning classification model manager 1508, a misalignment identifier 1514, a user interface manager 1516, and a storage manager 1518. The misalignment identification system 118 can be implemented as part of the campaign management system 102 in a distributed system of server devices for managing digital content campaigns for sending digital messages such as emails to a plurality of client devices of a plurality of users. Alternatively, the misalignment identification system 118 can be implemented on a single computing device such as the publisher client device 104 of FIG. 1.

In one or more embodiments, each of the components of the misalignment identification system 118 are in communication with one another using any suitable communication technologies. Additionally, the components of the misalignment identification system 118 can be in communication with one or more other devices including the publisher client device 104, as illustrated in FIG. 1. It will be recognized that although the components of the misalignment identification system 118 are shown to be separate in FIG. 15, any of the subcomponents may be combined into fewer components, such as into a single component, or divided into more components as may serve a particular implementation. Furthermore, although the components of FIG. 15 are described in connection with the misalignment identification system 118, at least some of the components for performing operations in conjunction with the misalignment identification system 118 described herein may be implemented on other devices within the environment.

The components of the misalignment identification system 118 can include software, hardware, or both. For example, the components of the misalignment identification system 118 can include one or more instructions stored on a computer-readable storage medium and executable by processors of one or more computing devices (e.g., the user client device 108 and the publisher client device 104). When executed by the one or more processors, the computer-executable instructions of the misalignment identification system 118 can cause the computing devices to perform the campaign management methods described herein. Alternatively, the components of the misalignment identification system 118 can comprise hardware, such as a special purpose processing device to perform a certain function or group of functions. Additionally or alternatively, the components of the misalignment identification system 118 can include a combination of computer-executable instructions and hardware.

Furthermore, the components of the misalignment identification system 118 performing the functions described herein may, for example, be implemented as part of a stand-alone application, as a module of an application, as a plug-in for applications including content management applications, as a library function or functions that may be called by other applications, and/or as a cloud-computing model. Thus, the components of the misalignment identification system 118 may be implemented as part of a stand-alone application on a personal computing device or a mobile device. Alternatively or additionally, the components of the misalignment identification system 118 may be implemented in any application that allows creation and delivery of marketing content to users, including, but not limited to, applications in ADOBE® ANALYTICS CLOUD, such as ADOBE® ANALYTICS, ADOBE® AUDIENCE MANAGER, ADOBE® CAMPAIGN, ADOBE® EXPERIENCE MANAGER, ADOBE® MEDIA OPTIMIZER, ADOBE® PRIMETIME, ADOBE® SOCIAL, and ADOBE® TAR- GET. "ADOBE", "ADOBE ANALYTICS CLOUD", "ADOBE ANALYTICS", "ADOBE AUDIENCE MANAGER", "ADOBE CAMPAIGN", "ADOBE EXPERIENCE MANAGER", "ADOBE PRIMETIME", "ADOBE SOCIAL", and "ADOBE TARGET" are registered trademarks of Adobe Inc. in the United States and/or other countries.

As shown in FIG. 15, the misalignment identification system 118 can include a digital link identifier 1504. The digital link identifier 1504 can identify, determine, and/or detect digital links within digital messages associated with one or more digital content campaigns. Specifically, the digital link identifier 1504 can analyze digital messages, identify the presence of a digital link, and mark digital messages containing digital links for further analysis for semantic misalignment. The digital link identifier 1504 can analyze digital messages that will be or have already been sent to recipients as part of a digital content campaign. For example, the digital link identifier 1504 can analyze digital messages that a publisher registers with the misalignment identification system 118. The digital link identifier 1504 can communicate with the storage manager 1518 to store past digital messages previously sent to recipients and new digital messages to be sent to recipients.

The misalignment identification system 118 also includes the alignment classification feature identifier 1506. The alignment classification feature identifier 1506 analyzes the digital message 302, the digital link 304, and the external digital content 306 to extract one or more alignment classification features. Specifically, the alignment classification feature identifier 1506 can extract a semantic similarity feature, a longest common subsequence feature, a number alignment feature, URL features, a visual chunk feature, and/or a color statistic feature. The alignment classification feature identifier 1506 can extract alignment classification features from past digital messages previously sent using the misalignment identification system 118 from a particular publisher or multiple publishers.

The misalignment identification system 118 also includes the machine learning classification model manager 1508. The machine learning classification model manager 1508 includes a machine learning classification model training engine 1510 and a machine learning classification model application engine 1512. The machine learning classification model training engine 1510 trains network parameters of the machine learning classification model using training data. The machine learning classification model training engine 1510 compares predicted misalignments and probability scores with training data. The machine learning classification model training engine 1510 can determine, evaluate, identify, or generate a measure of loss or an error. The machine learning classification model training engine 1510 can access public training datasets and a personal dataset.

The machine learning classification model manager 1508 also includes the machine learning classification model application engine 1512. For instance, the machine learning classification model application engine 1512 generates misalignments and alignment probability scores for digital messages, digital links, and external digital content. In particular, the machine learning classification model application engine 1512 applies the network parameters trained by the machine learning classification model training engine 1510 to the plurality of alignment classification features to generate alignment probability scores for alignment classes.

As illustrated in FIG. 15, the misalignment identification system 118 includes the misalignment identifier 1514. The misalignment identifier 1514 determines misalignments based on the misalignment classes and their corresponding alignment probability scores. In particular, the misalignment identifier 1514 accesses threshold values and compares the alignment probability scores with the threshold values to determine misalignments (i.e., misalignment classes to report to the publisher.

The misalignment identification system 118 also includes the user interface manager 1516. The user interface manager 1516 generates, manages, and receives input from one or more graphical user interfaces. The user interface manager 1516 generates, at the publisher client device, the misalignment identification user interface that reports the determined misalignments. Additionally, the user interface manager 1516 receives input via the misalignment identification user interface including threshold adjustments and corrected misalignments.

The misalignment identification system 118 also includes the storage manager 1518 (that comprises a non-transitory computer memory) that stores and maintains data associated with digital content campaigns. The storage manager 1518 includes public training data 1520, personal training data 1522, and digital content 1524 (e.g., digital messages).

Figure 16:
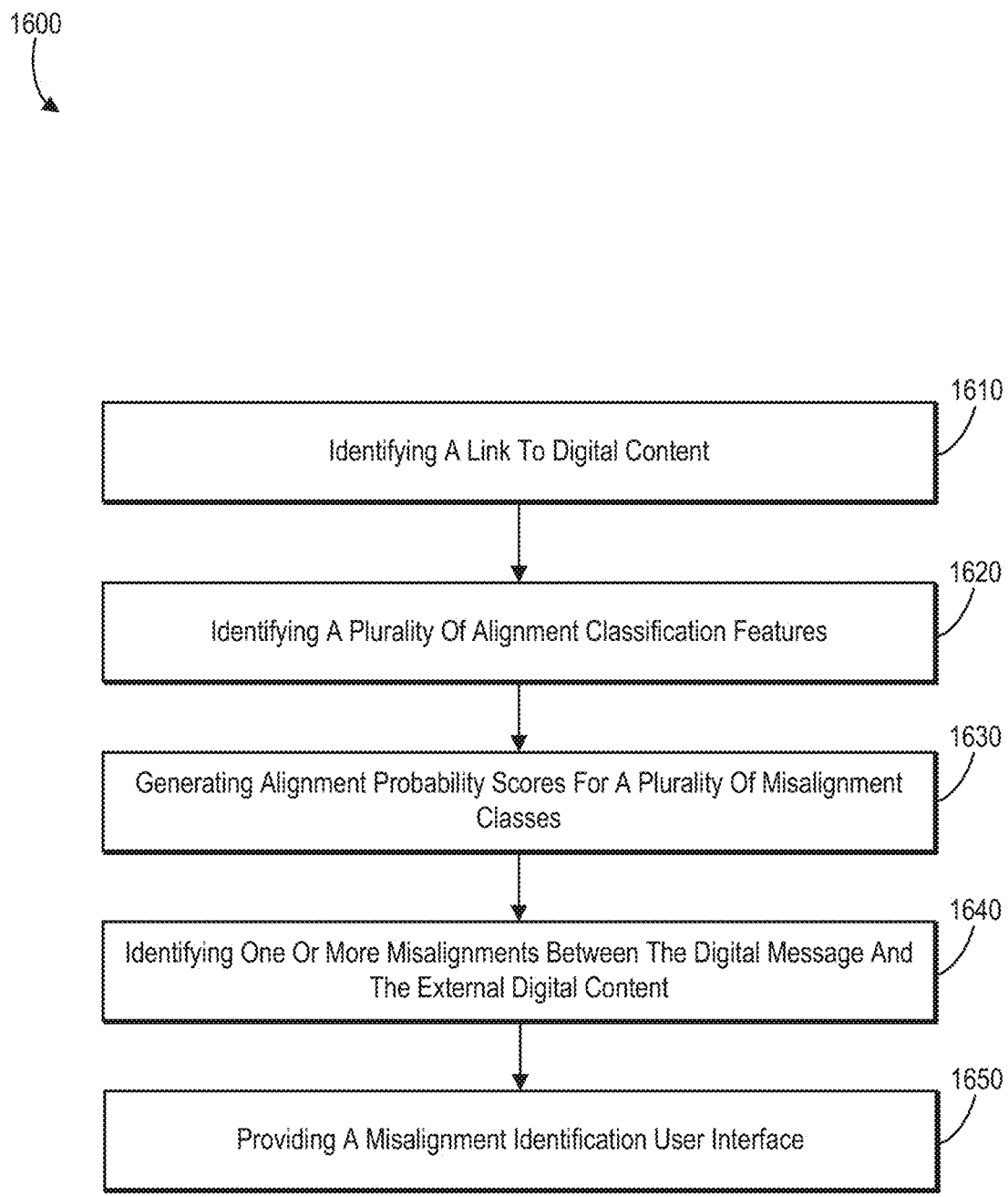
FIG. 16 illustrates a flowchart of a series of acts in a method of providing a misalignment identification user interface in accordance with one or more embodiments.

FIG. 16 illustrates a flowchart of a method for providing a misalignment identification user interface. While FIG. 16 illustrates acts according to one embodiment, alternative embodiments may omit, add to, reorder, and/or modify any of the acts shown in FIG. 16. The acts of FIG. 16 can be performed as part of a method. Alternatively, a non-transitory computer readable medium can comprise instructions that, when executed by one or more processes, cause the computing device to perform the acts of FIG. 16. In still further embodiments, a system can perform the acts of FIG. 16.

As shown in FIG. 16, the series of acts 1600 includes the act 1610 of identifying a link to digital content. For example, the act 1610 includes identifying, within a digital message, a digital link to external digital content. In at least one embodiment, and as illustrated above, the digital link comprises a URL.

The series of acts 1600 includes the act 1620 of identifying a plurality of alignment classification features. For example, the act 1620 includes identifying a plurality of alignment classification features based on the digital link, the digital message, and the external digital content. The act 1620 can further include identifying the plurality of alignment classification features by: determining a critical area corresponding to the digital link, the critical area comprising additional digital content in the digital message comprising the URL; extracting a critical area feature vector from the critical area and an external digital content feature vector from the external digital content; and comparing the critical area feature vector and the external digital content feature vector to generate a semantic similarity feature of the plurality of alignment classification features.

The act 1620 can include identifying the plurality of alignment classification features by: comparing the digital message and the external digital content to identify a common subsequence between the digital message and the external digital content; and generating a common subsequence feature of the plurality of alignment classification features based on the common subsequence. Additionally, the act 1620 can include identifying the plurality of alignment classification features by: identifying message numbers within the digital message and external numbers within the external digital content; and comparing the message numbers within the digital message with the external numbers within the external digital content to generate a number alignment feature of the plurality of alignment classification features. For example, the act 1620 can include the act 704 of generating a number alignment feature (as discussed in FIG. 7).

The act 1620 can also include identifying the plurality of alignment classification features by: identifying a URL associated with the digital link having a first URL length and a destination URL associated with the external digital content having a second URL length; and comparing the first URL length associated with the digital link with the second URL length associated with the external digital content to determine a URL length consistency feature of the plurality of alignment classification features. The act 1620 can include identifying the plurality of alignment classification features by: identifying additional digital links within the digital message; determining a digital link URL associated with the digital link and additional digital link URLs associated with the additional digital links; and comparing the digital link URL with the additional digital link URLs to generate a message URL similarity feature of the plurality of alignment classification features.

The act 1620 can include identifying the plurality of alignment classification features by: identifying additional digital links within the digital message; determining a digital link URL associated with the digital link and additional digital link URLs associated with the additional digital links; and comparing the digital link URL with the additional digital link URLs to generate a message URL similarity feature of the plurality of alignment classification features. The act 1620 can include identifying the plurality of alignment classification features by: generating a digital image of the external digital content; analyzing the digital image to determine a number of visual chunks and the size and position of a target visual chunk; and determining a visual chunk feature based on the number of visual chunks and the size and position of the target visual chunk, wherein the plurality of alignment classification features comprises the visual chunk feature. The act 1620 can include identifying the plurality of alignment classification features by analyzing visual content of the external digital content to determine a color statistic feature of the plurality of alignment classification features comprises the color statistic feature.

Moreover, as illustrated in FIG. 16, the series of acts 1600 includes the act 1630 of generating alignment probability scores for a plurality of misalignment classes. The act 1630 includes utilizing a machine learning classification model to generate alignment probability scores for a plurality of misalignment classes based on the alignment classification features.

As shown in FIG. 16, the series of acts 1600 includes the act 1640 of identifying one or more misalignments between the digital message and the external digital content. The act 1640 includes identifying one or more misalignments between the digital message and the external digital content based on the alignment probability scores. The act 1640 can include an act of identifying the plurality of alignment classification features by comparing the alignment probability scores with threshold probability scores corresponding to the misalignment classes.

As shown in FIG. 16, the series of acts 1600 includes the act 1650 of providing a misalignment identification user interface. For example, the act 1650 includes providing, for display at a publisher device, a misalignment identification user interface comprising the one or more misalignments.

The series of acts 1600 can include providing, for display, a plurality of threshold adjustment user interface elements; and identifying the threshold probability scores corresponding to the misalignment classes by: determining a first threshold probability score for a first misalignment class based on a first user interaction with a first threshold adjustment user interface element; and determining a second threshold probability score for a second misalignment class based on a second user interaction with a second threshold adjustment user interface element.

In addition (or in the alternative) to the acts described above, in some embodiments, the series of acts 1600 include a step for training a machine learning classification model to identify misalignments from a plurality of misalignment classes between digital messages and external digital content. For example, the acts described in reference to FIG. 11B can comprise the corresponding acts (or structure) for performing a step for training a machine learning classification model to identify misalignments from a plurality of misalignment classes between digital messages and external digital content.

In addition (or in the alternative) to the acts described above, in some embodiment, the acts 1600 include a step for utilizing the machine learning classification model to identify one or more misalignments from the plurality of misalignment classes between the digital link and the external digital content. For example, the acts described in reference to FIG. 3, FIG. 11A can comprise the corresponding acts (or structure) for performing a step for utilizing the machine learning classification model to identify one or more misalignments from the plurality of misalignment classes between the digital link and the external digital content.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 17:
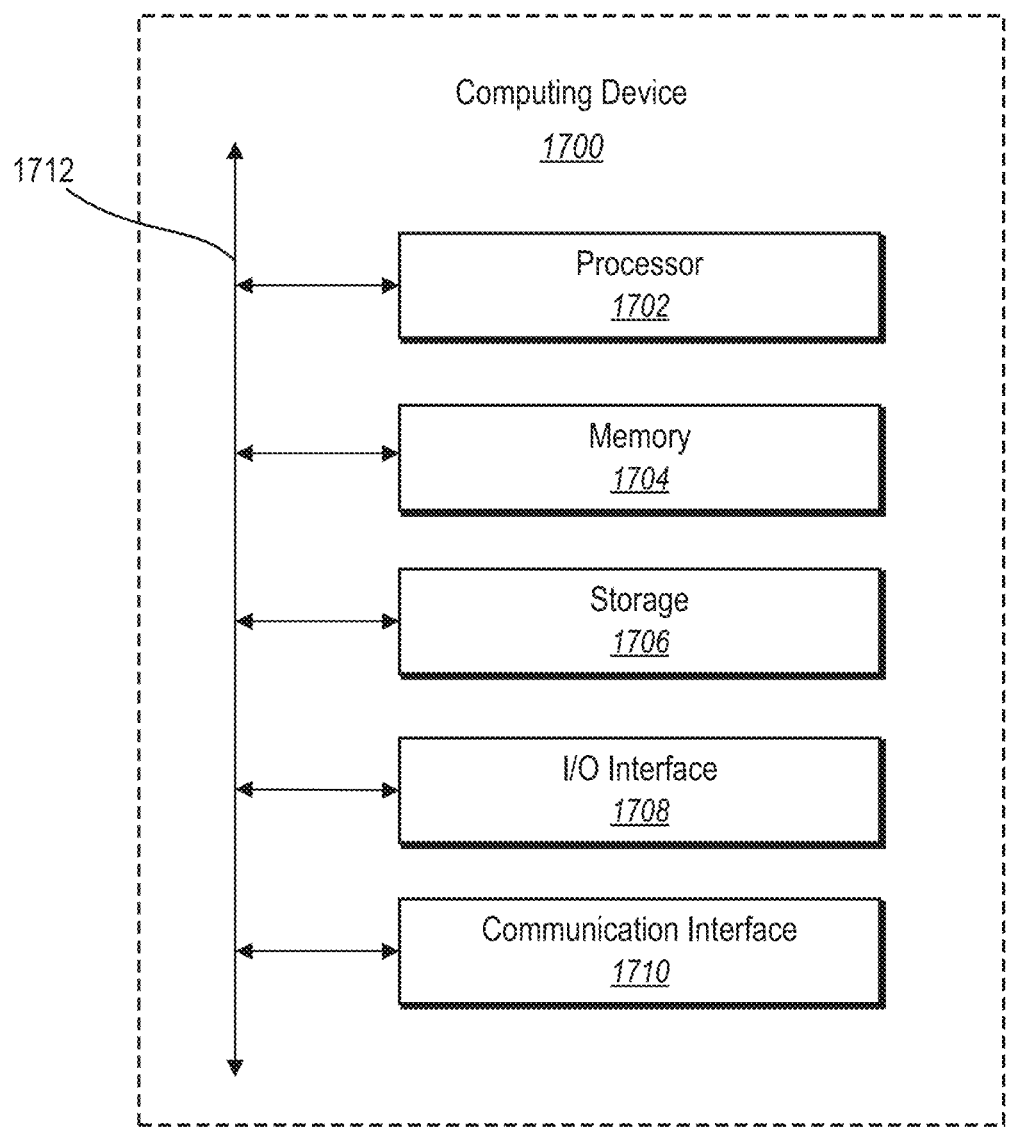
FIG. 17 illustrates a block diagram of an exemplary computing device in accordance with one or more embodiments.

FIG. 17 illustrates a block diagram of a computing device 1700 that may be configured to perform one or more of the processes described above. One will appreciate that one or more computing devices such as the computing device 1700 may implement the misalignment identification system 118 and the campaign management system 102. As shown by FIG. 17, the computing device 1700 can comprise a processor 1702, a memory 1704, a storage device 1706, an I/O interface 1708, and a communication interface 1710, which may be communicatively coupled by way of a communication infrastructure 1712. In certain embodiments, the computing device 1700 can include fewer or more components than those shown in FIG. 17. Components of the computing device 1700 shown in FIG. 17 will now be described in additional detail.

In one or more embodiments, the processor 1702 includes hardware for executing instructions, such as those making up a computer program. As an example, to execute instructions for dynamically modifying workflows, the processor 1702 may retrieve (or fetch) the instructions from an internal register, an internal cache, the memory 1704, or the storage device 1706 and decode and execute them. The memory 1704 may be a volatile or non-volatile memory used for storing data, metadata, and programs for execution by the processor(s). The storage device 1706 includes storage, such as a hard disk, flash disk drive, or other digital storage device, for storing data or instructions for performing the methods described herein.

The I/O interface 1708 allows a user to provide input to, receive output from, and otherwise transfer data to and receive data from computing device 1700. The I/O interface 1708 may include a mouse, a keypad or a keyboard, a touch screen, a camera, an optical scanner, network interface, modem, other known I/O devices or a combination of such I/O interfaces. The I/O interface 1708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1708 is configured to provide graphical data to a display for presentation to a user. The graphical data may be representative of one or more graphical user interfaces and/or any other graphical content as may serve a particular implementation.

The communication interface 1710 can include hardware, software, or both. In any event, the communication interface

1710 can provide one or more interfaces for communication (such as, for example, packet-based communication) between the computing device 1700 and one or more other computing devices or networks. As an example and not by way of limitation, the communication interface 1710 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1710 may facilitate communications with various types of wired or wireless networks. The communication interface 1710 may also facilitate communications using various communication protocols. The communication infrastructure 1712 may also include hardware, software, or both that couples components of the computing device 1700 to each other. For example, the communication interface 1710 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as digital messages, user interaction information, engagement metrics, or campaign management resources.

In the foregoing specification, the present disclosure has been described with reference to specific exemplary embodiments. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital medium environment for implementing a plurality of digital content campaigns by generating and providing a plurality of digital messages with a plurality of digital links to dynamic digital content, a computer-implemented method for identifying misalignments and misalignment types in the plurality digital links to the dynamic digital content, comprising:
   determining a plurality of misalignment classes, wherein the plurality of misalignment classes reflect categories of misalignments between digital messages and external digital content items;
   identifying a digital link to external content within a digital message;
   extracting an expectation feature vector from the digital message and an external digital content feature vector from the external content;
   utilizing a machine learning classification model to generate alignment probability scores for the plurality of misalignment classes based on the expectation feature vector and the external digital content feature vector;
   identifying one or more misalignments between the digital message and the external content and one or more misalignment classes based on the alignment probability scores; and
   providing, for display at a publisher device, a misalignment identification user interface comprising the one or more misalignments and the one or more misalignment classes.

2. The method of claim 1, further comprising extracting the expectation feature vector by:
   determining a critical area corresponding to the digital link, the critical area comprising additional digital content in the digital message comprising the digital link;
   generating a critical area feature vector from the critical area;
   generating a global message feature vector by analyzing the digital message; and
   combining the critical area feature vector and the global message feature vector.

3. The method of claim 2, wherein the critical area feature vector and the global message feature vector comprise fixed-length feature vectors.

4. The method of claim 1, further comprising providing, for display, a threshold adjustment user interface element for entering adjusted thresholds for identifying misalignments in relation to the plurality of misalignment classes.

5. The method of claim 1, wherein the plurality of misalignment classes comprise at least two of an empty classification, a loading error classification, a semantic relevance classification, a popup classification, a login classification, or a missing critical information classification.

6. A non-transitory computer readable medium storing instructions thereon that, when executed by at least one processor, cause a computing device to:
   determine a plurality of misalignment classes, wherein the plurality of misalignment classes reflect categories of misalignments between digital messages and external digital content items;
   identify a digital link to external digital content within a digital message;
   extract an expectation feature vector from the digital message and an external digital content feature vector from the external digital content utilize a machine learning classification model to generate alignment probability scores for the plurality of misalignment classes based on the expectation feature vector and the external digital content feature vector;
   identify one or more misalignments between the digital message and the external digital content based on the alignment probability scores; and
   provide, for display at a publisher device, a misalignment identification user interface comprising the one or more misalignments and the plurality of misalignment classes.

7. The non-transitory computer readable medium of claim 6 further comprising instructions that, when executed by the at least one processor, cause the computing device to identify a plurality of alignment classification features based on the digital message and the external digital content; and utilizing the machine learning classification model to generate the alignment probability scores based on the plurality of alignment classification features.

8. The non-transitory computer readable medium of claim 7, further comprising instructions that, when executed by the at least one processor, cause the computing device to identify the plurality of alignment classification features by:
comparing the digital message and the external digital content to identify a common subsequence between the digital message and the external digital content; and
generating a common subsequence feature of the plurality of alignment classification features based on the common subsequence.

9. The non-transitory computer readable medium of claim 7, further comprising instructions that, when executed by the at least one processor, cause the computing device to identify the plurality of alignment classification features by:
identifying message numbers within the digital message and external numbers within the external digital content; and
comparing the message numbers within the digital message with the external numbers within the external digital content to generate a number alignment feature of the plurality of alignment classification features.

10. The non-transitory computer readable medium of claim 7, further comprising instructions that, when executed by the at least one processor, cause the computing device to identify the plurality of alignment classification features by:
identifying a URL associated with the digital link having a first URL length and a destination URL associated with the external digital content having a second URL length; and
comparing the first URL length associated with the digital link with the second URL length associated with the external digital content to determine a URL length consistency feature of the plurality of alignment classification features.

11. The non-transitory computer readable medium of claim 7, further comprising instructions that, when executed by the at least one processor, cause the computing device to identify the plurality of alignment classification features by:
identifying additional digital links within the digital message;
determining a digital link URL associated with the digital link and additional digital link URLs associated with the additional digital links; and
comparing the digital link URL with the additional digital link URLs to generate a message URL similarity feature of the plurality of alignment classification features.

12. The non-transitory computer readable medium of claim 11, further comprising instructions that, when executed by the at least one processor, cause the computing device to identify a destination URL similarity feature by:
identifying additional external digital content items associated with the additional digital links within the digital message;
determining additional destination URLs associated with the external digital content items; and
comparing the destination URL associated with the external digital content with the additional destination URLs associated with the additional external digital content.

13. The non-transitory computer readable medium of claim 7, further comprising instructions that, when executed by the at least one processor, cause the computing device to identify the plurality of alignment classification features by:
generating a digital image of the external digital content;
analyzing the digital image to determine a number of visual chunks and a size and position of a target visual chunk; and
determining a visual chunk feature based on the number of visual chunks and the size and position of the target visual chunk, wherein the plurality of alignment classification features comprises the visual chunk feature.

14. The non-transitory computer readable medium of claim 7, further comprising instructions that, when executed by the at least one processor, cause the computing device to identify the plurality of alignment classification features by analyzing visual content of the external digital content to determine a color statistic feature of the plurality of alignment classification features comprises the color statistic feature.

15. The non-transitory computer readable medium of claim 6, further comprising instructions that, when executed by the at least one processor, cause the computing device to identify the one or more misalignments by comparing the alignment probability scores with threshold probability scores corresponding to the plurality of misalignment classes.

16. The non-transitory computer readable medium of claim 15, further comprising instructions that, when executed by the at least one processor, cause the computing device to:
provide, for display, a plurality of threshold adjustment user interface elements; and
identify the threshold probability scores corresponding to the plurality of misalignment classes by:
determining a first threshold probability score for a first misalignment class based on a first user interaction with a first threshold adjustment user interface element; and
determining a second threshold probability score for a second misalignment class based on a second user interaction with a second threshold adjustment user interface element.

17. A system comprising:
at least one processor; and
at least one non-transitory computer readable storage medium storing instructions thereon that, when executed by the at least one processor, cause the system to:
determine a plurality of misalignment classes, wherein the plurality of misalignment classes reflect categories of misalignments between digital messages and external digital content items;
identify a digital link to external digital content within a digital message;
extract an expectation feature vector from the digital message and an external digital content feature vector from the external digital content;
utilize a machine learning classification model to generate alignment probability scores for the plurality of misalignment classes based on the expectation feature vector and the external digital content feature vector;
identify one or more misalignments between the digital message and the external digital content based on the alignment probability scores; and
provide, for display at a publisher device, a misalignment identification user interface comprising the one or more misalignments and the plurality of misalignment classes.

18. The system as recited in claim 17, wherein the digital link comprises a URL and further comprising instructions that, when executed by the at least one processor, cause the system to identify the one or more misalignments corresponding to the plurality of misalignment classes by generating a plurality of alignment classification features.

19. The system as recited in claim 17, further comprising instructions that, when executed by the at least one processor, cause the system to identify the one or more misalignments by comparing alignment probability scores with threshold probability scores corresponding to the plurality of misalignment classes.

20. The system as recited in claim 19, further comprising instructions that, when executed by the at least one processor, cause the system to:
 provide, for display, a plurality of threshold adjustment user interface interments; and
 identify the threshold probability scores corresponding to the plurality of misalignment classes by:
  determining a first threshold probability score for a first misalignment class based on a first user interaction with a first threshold adjustment user interface element; and
  determining a second threshold probability score for a second misalignment class based on a second user interaction with a second threshold adjustment user interface element.

* * * * *